United States Patent [19]
Yamamoto et al.

[11] Patent Number: 4,959,679
[45] Date of Patent: Sep. 25, 1990

[54] CAMERA SYSTEM

[75] Inventors: Kouji Yamamoto, Sakai; Shinji Tominaga, Osaka; Akira Yamanaka, Sakai; Hiroshi Ueda, Nara; Nobuyuki Taniguchi, Tondabayashi; Ikushi Nakamura; Michihiro Iwata, both of Sakai, all of Japan

[73] Assignee: Minolta Camera Kabushiki Kaisha, Osaka, Japan

[21] Appl. No.: 374,574

[22] Filed: Jun. 29, 1989

Related U.S. Application Data

[63] Continuation of Ser. No. 169,451, Mar. 17, 1988, abandoned, which is a continuation of Ser. No. 797,510, Nov. 13, 1985, abandoned.

[30] Foreign Application Priority Data

| Nov. 14, 1984 | [JP] | Japan | 59-173261 |
| Dec. 28, 1984 | [JP] | Japan | 59-197143 |
| Feb. 27, 1985 | [JP] | Japan | 60-28848 |
| Mar. 8, 1985 | [JP] | Japan | 60-33950 |
| Mar. 12, 1985 | [JP] | Japan | 60-35962 |
| Mar. 12, 1985 | [JP] | Japan | 60-35963 |
| Mar. 27, 1985 | [JP] | Japan | 60-45490 |
| Mar. 27, 1985 | [JP] | Japan | 60-45491 |
| Mar. 28, 1985 | [JP] | Japan | 60-46676 |
| Mar. 28, 1985 | [JP] | Japan | 60-46677 |
| Mar. 28, 1985 | [JP] | Japan | 60-46678 |

[51] Int. Cl.$^5$ .................. G03B 15/03; G03B 17/18
[52] U.S. Cl. .................. 354/419; 354/474; 354/127.12; 354/289.12
[58] Field of Search .......... 354/238.1, 413, 419, 354/441, 442, 443, 465, 471–475, 173.1, 173.11, 212, 215, 217, 218, 289.1, 289.12, 127.1, 127.11, 127.12

[56] References Cited

U.S. PATENT DOCUMENTS

| 3,842,587 | 10/1974 | Strauss et al. | 354/412 |
| 4,114,173 | 9/1978 | Tezuka et al. | 354/238.1 |
| 4,222,660 | 9/1980 | Furuichi | 355/14 R |
| 4,286,849 | 9/1981 | Uchiodoi et al. | 354/289.1 X |
| 4,302,085 | 11/1981 | Kazami et al. | 354/215 X |
| 4,361,389 | 11/1982 | Monks et al. | 354/267 X |
| 4,390,261 | 6/1983 | Yamamoto et al. | 354/173.1 |
| 4,440,481 | 4/1984 | Hoda et al. | 354/289.12 |
| 4,500,191 | 2/1985 | Yamanaka | 354/419 X |
| 4,525,054 | 6/1985 | Someya et al. | 354/289.1 X |
| 4,529,291 | 7/1985 | Mizogui | 354/443 |
| 4,589,757 | 5/1986 | Maitani et al. | 354/472 X |
| 4,636,055 | 1/1987 | Alyfuku | 354/465 |

FOREIGN PATENT DOCUMENTS

| 55-108434 | 7/1980 | Japan. |
| 58-123526 | 7/1983 | Japan. |
| 59-171937 | 9/1984 | Japan. |
| 60-28634 | 2/1985 | Japan. |

OTHER PUBLICATIONS

One-page Brochure, "Camera AF–S–Quartz Date", Minolta Camera.
Minolta Hi-Matic AF2-M/AF2/S2.
Fuji Cardia (DL-200).
Canon Camera T-70, Modern Photography, Jul. 1984, p. 62, col. 3, lines 3–11.
Modern Photography, "Canon T70: Motorized Computerized Multi-Program 35 mm SLR", pp. 60–69, Jul. 1984.

*Primary Examiner*—W. B. Perkey
*Attorney, Agent, or Firm*—Burns, Doane, Swecker & Mathis

[57] ABSTRACT

A mode selecting device for use in a camera provided with the various picture taking modes including standard picture taking mode, self-timer picture taking mode, flash light picture taking mode, close picture taking mode, fill in flash mode, nonflash mode and consecutive picture taking mode. A mode setting button is operable to select the mode and a memory is provided to store data corresponding to the selected mode. Also disclosed is a brightness measuring circuit and an automatic exposure control circuit. A flash is enabled or disabled in accordance with the mode selected and the measured brightness value. The camera is automatically reset to the most frequently used mode for emitting the flash light automatically under low light condition after a exposure has been completed, or a given time after the exposure has been completed. Additionally, a warning indicator is actuated when it is detected that the rear lid has been opened and film is mounted in the camera, and a display is provided to indicate the presence of film in the camera when a warning signal has been stored.

19 Claims, 22 Drawing Sheets

CAMERA SYSTEM

This application is a continuation of application Ser. No. 169,451, filed Mar. 17, 1988, now abandoned, which is a continuation of application Ser. No. 797,510 filed Nov. 13, 1985, now abandoned.

BACKGROUND OF THE INVENTION

1. Field of the Invention

The present invention relates to a camera system and more particularly to a camera system having display unit for displaying various information necessary for picture taking.

2. Description of the Prior Art

In a conventional automatic camera with a lens shutter wherein various controls and adjustments necessary for picture taking are automatically made, it is desired to decrease failure of picture taking partly because such a low cost camera is generally used by a beginner. In such a camera of the type mentioned above, as the operation modes, there are provided a normal picture taking mode, self timer picture taking mode, flash light picture taking mode, close picture taking mode, fill in flash mode and consecutive picture taking mode in the camera. In using such automatic camera, in case an operator of the camera forgets that the camera was once already set to any one of the camera modes other than the normal picture taking mode and with the camera he takes a picture which is to be taken under the normal picture taking mode, the operator fails in taking a good picture.

In order to prevent such drawback, there is proposed to return the camera mode to normal picture taking mode automatically from the self timer picture taking mode every time when a picture taking is once completed. However, in the proposed device, change of the mode is performed by a mechanical arrangement, whereby the device becomes bulky and if the number of the possible modes increased, there are many mechanical arrangements for setting camera modes, thereby resulting in increasing the camera size.

OBJECTS OF THE INVENTION

An essential object of the present invention is to provide a camera having a mode selecting device which is able to returns to the normal picture taking mode from various kinds of the camera modes automatically with a decreased size and an easy operation.

Another object of the present invention is to provide a camera in which the camera modes set in the camera is easily recognized.

A further object of the present invention is to provide a camera which is able to take pictures correctly with easy operation.

SUMMARY OF THE INVENTION

These and other objects of the invention are accomplished by a mode selecting device for use in a camera provided with the various picture taking modes including standard picture taking mode, self-timer picture taking mode, close picture taking mode, flash mode, fill in flash mode, non-flash mode and consecutive picture taking mode. A mode setting button is operable to select the mode and a memory is provided to store data corresponding to the selected mode. Also disclosed is a brightness measuring circuit and an automatic exposure control circuit. A flash is enabled or disabled in accordance with the mode selected and the measured brightness value. The camera is automatically reset to the most frequently used mode for emitting the flash light automatically under low light conditions. Additionally, a warning indicator is actuated when it is detected that the rear lid has been opened and film is mounted in the camera, and a display is provided to indicate the presence of film in the camera when a warning signal has been stored.

DETAILED DESCRIPTION OF A PREFERRED EMBODIMENT

Figure 1:
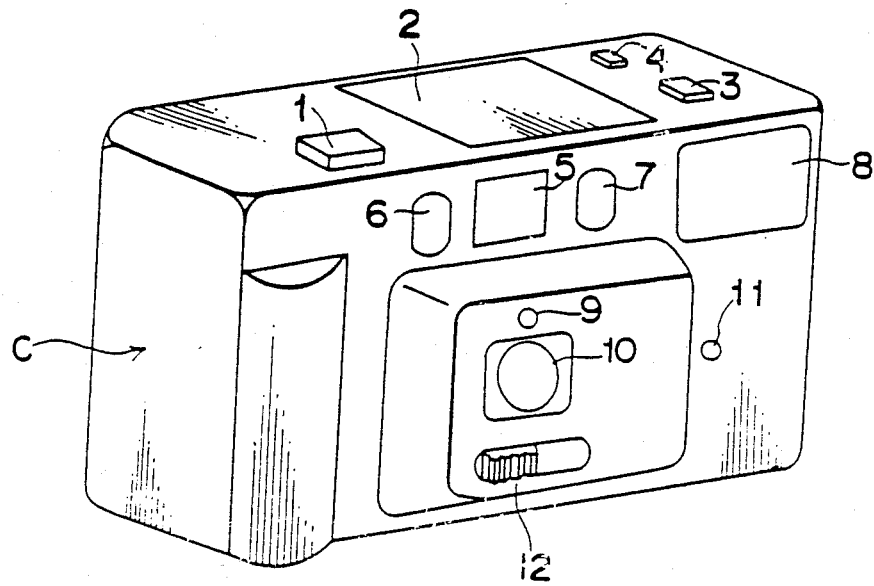
FIG. 1 is a perspective view showing an example of a camera according to the present invention.

Referring to FIG. 1, showing a camera according to the present invention, there are provided a release button 1, a display unit 2, a mode setting button 3 and a film counter setting button 4 on the top panel of the camera body C. There are provided a finder window 5, a pair of range finder windows 6 and 7, a flash light emitting window 8, a light receiving window 9 for an automatic exposure control, an objective lens 10 and a self timer indication lamp 11 on the front panel of the camera body C. 12 denotes a slider for opening and closing a lens cover (not shown).

The release button 1 is operable in such manner that when said release button 1 is depressed to a first depth a light measurement switch is turned on to enable light measurement for the exposure control and when the release button 1 is further depressed to a second depth, a release switch is turned on to start the exposure control.

Since a film counter used in the preferred embodiment is an electronic type, when a battery is consumed or removed from the camera, the content of the film counter is cleared off. Thus, when the battery is exchanged in the camera, the number of the frame of the film in the camera can be preset in the film counter by operation of the film setting button 4.

Figure 2:
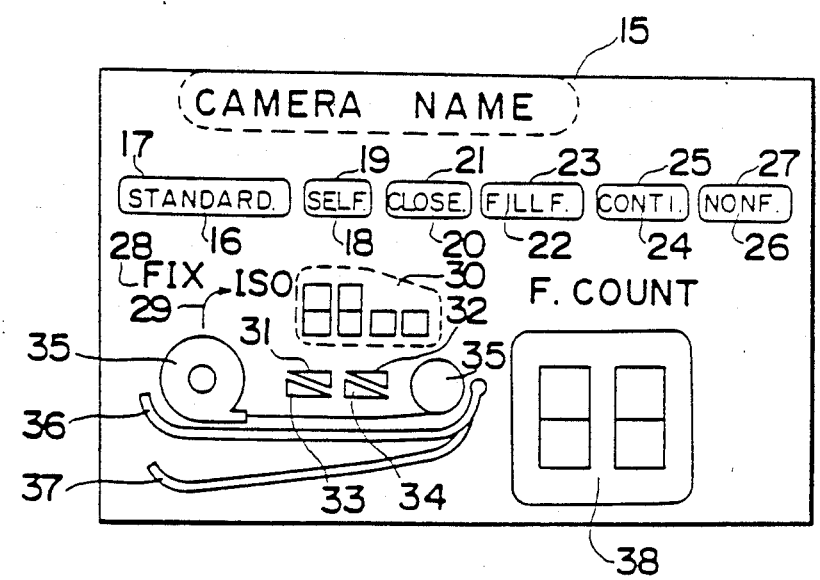
FIG. 2 is a top plan view showing a display unit used in the camera shown in FIG. 1.

FIG. 2 shows the details displayed in the display unit 2. A display part 15 is provided for displaying the name of the camera or the name of the manufacturer of the camera. The display part 15 is enabled when the objective lens 10 is uncovered. 16, 18, 20, 22, 24 and 26 are displaying parts for displaying various picture taking modes. The part 16 labeled STANDARD is enabled when the camera is set in the normal photographing mode, in which the a photographing is made under an ambient light when the exposure time calculated based on the light measurement is faster than a predetermined time, and under a flash light when the calculated exposure time is slower than the predetermined value. The part 18 labeled SELF represents a self timer photographing mode in which a photographing is started under the normal photographing mode when ten seconds are lapsed after the operation of the release button 1. The part 20 labeled CLOSE represents a close up photographing mode in which a close photographing with a flash light is made under the minimum aperture opening value. The part 22 labeled FILL.F. represents a fill in flash mode in which the shutter speed is controlled on the basis of the result of the measurement of the ambient light with a flash light. The part 24 labeled CONTI represents a consecutive photographing mode or a continuous photographing mode in which a plurality of ambient light picture taking can be consecutively made so far as the release operation is depressed even if the shutter speed is low. In one modification, the flash light photographing can be made only when the flash light photographing is available, while the release button 1 is brought into a locked state if the flash light photographing is not available. The part 26 labeled NON.F. represents a non flash light photographing mode in which the flash light is not used but an ambient light photographing can be made even if the shutter speed is low. These labels mentioned above are displayed only when the objective lens is uncovered. The respective labels are surrounded by frames 17, 19, 21, 23, 25 and 27 which illuminate corresponding mode. Namely when the normal mode is selected, the frame 17 illuminates. When the self timer mode is selected, the frame 19 illuminates. The frames 21, 23, 25 and 27 illuminate for the close up mode, fill in flash mode, consecutive mode and non.flash light mode respectively.

An ISO sensitivity display unit 30 is provided for displaying the ISO sensitivity of the photographing film set in the camera. When the ISO sensitivity is read out of the film container by means of a data reading mechanism (not shown) provided in the camera, a mark 29 is also displayed. In case the film container is not provided with signal output members or the film container is not mounted in the camera, ISO 100 is displayed at the ISO sensitivity display unit 30 and characters FIX 28 are displayed. A mark 35 of double circles is displayed when the film container is mounted in the camera and then a rear lid is closed. In case the rear lid is once opened with the film container remaining in the camera then the rear lid is closed, the mark 35 is turned on and off repeatedly so as to warn the fact that the rear lid is opened but the film container is not removed. A pair of triangular shape marks 31 and 32 are repeatedly turned on and off alternately while the photographic film is rewound and another pair of triangular shape marks 33 and 34 are repeatedly turned on and off alternately while the photographic film is wound up. A mark 36 extending in a horizontal direction is turned on when the rear lid is completely closed and a mark 37 slanted relative to the mark 36 is turned on when the rear lid is not closed. When rewinding of the photographic film is completed, the marks 36 and 37 are alternately turned on and off to promote the operator to take out the film container from camera.

Reference numeral 38 denotes a film frame number display unit which displays the number of the frame of the photographic film in position in such a manner that when the photographic film is not mounted in the camera the number 0 is displayed. When the photographic film is mounted in the camera, mark—is displayed during a preliminary forwarding of the leading portion of the film and the number 1 is displayed when the first frame of the photographic film is advanced to position. The contents displayed in the display unit 38 are changed one by one each time the frame of the film is advanced. When the contents of the display unit 38 are (39), if the contents are increased, the contents of the display unit 38 changes to 1. When the battery is removed from the camera with the photographic film is loaded in the camera, the display unit 38 displays 00 flashing. The number of the frame displayed by the display unit 38 can be preset by operation of the film counter setting button 4.

In case the battery is consumed and the power of the battery lowers under a predetermined value, the numerals on the display unit 38 is flashing to warn to replace the battery.

Figure 3:
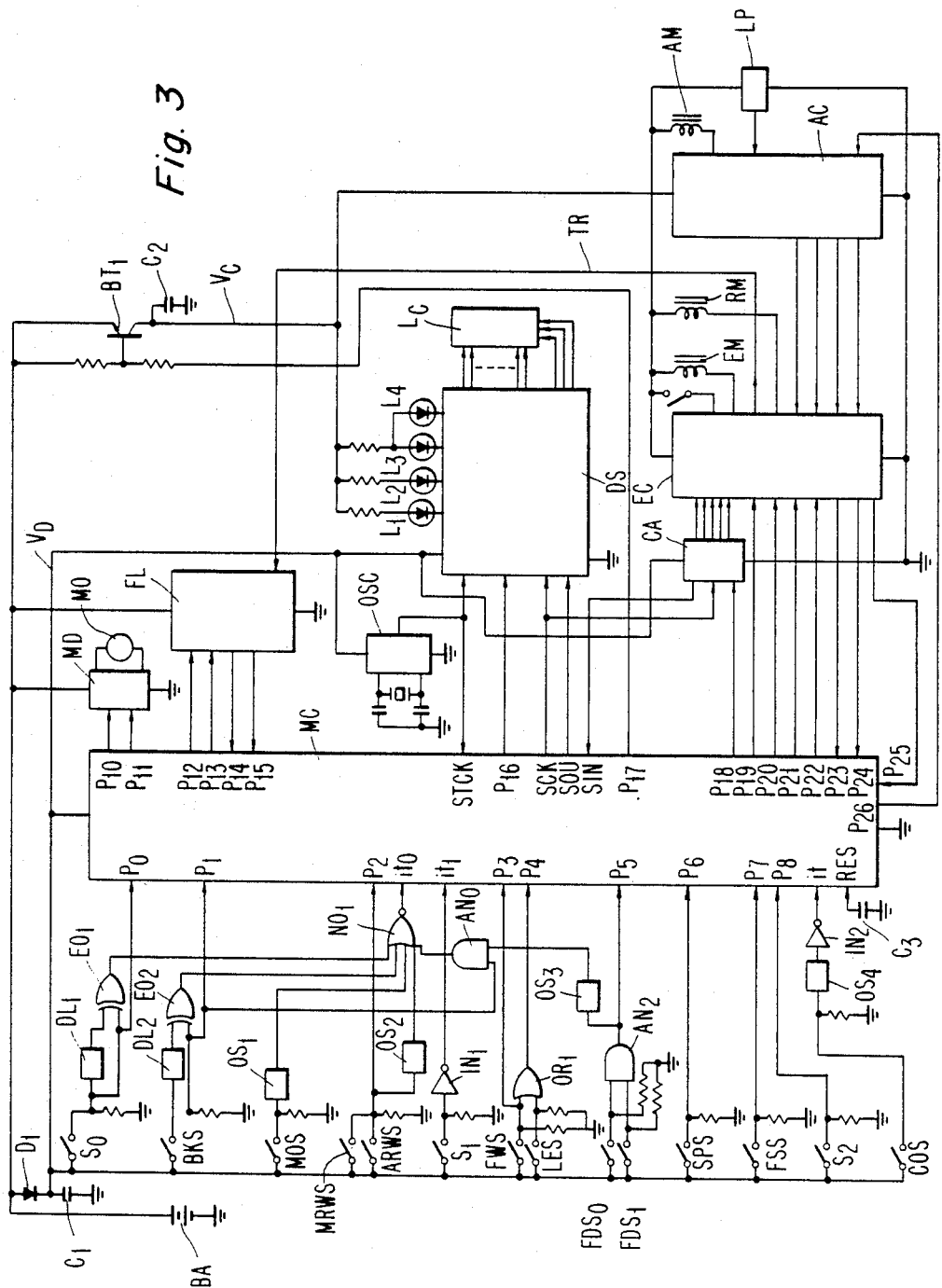
FIG. 3 is a circuit diagram of an example of a control device used in the camera shown in FIG. 1.

Referring to FIG. 3 showing a circuit diagram of the camera according to the present invention in which a battery BA is connected to a flash circuit FL and a motor control circuit MD through a power supply line +E. A series circuit made of a diode D1 and a capacitor C1 is connected in parallel with the battery BA and the junction point between the diode D1 and capacitor C1 provides a power supply line VD which supplies the DC power to a microprocessor MC, an oscillator OSC, a display control circuit DS, a film sensitivity read circuit CA, a delay circuits DL1 and DL2, one shot multivibrator circuits OS1 to OS4, inverters IN1 and IN2, exclusive OR circuits EO1 and EO2, AND gates $AN_0$ and $AN_2$ and an OR gate OR1 and a NOR gate NO1. The capacitor C1 has a relatively large capacitance for facilitating to supply the necessary DC power to the terminal VD, even if the battery BA is removed from the camera in a short period for exchange of the battery. Also, the large capacitance of the capacitor C1 facilitates to supply enough voltage to the microprocessor MC to prevent a failure in operation of the microprocessor MC due to a voltage drop of the battery BA during boosting of power for the flash light.

A transistor BT1 is controlled by the signal of the terminal p17 of the microprocessor MC. When the transistor BT1 is turned on, the power source of the battery BA is supplied through a line VC to an automatic exposure control circuit EC, an automatic focusing unit AC and light emitting diodes or LEDs L1 to L4.

A switch S0 is operably coupled with the lens cover so as to be turned on and off corresponding to closure and opening of the lens cover. When the switch S0 is switched from on to off or off to on, a High pulse is generated by the delay circuit DL1 and exclusive OR circuit EO1 to the NOR gate NO1. A switch BKS is operably coupled with the rear lid of the camera so as to be turned on when the rear lid is opened and to be turned off when the rear lid is closed. When the switch BKS is switched from on to off or from off to on, a High pulse is generated by the delay circuit DL2 and exclusive OR circuit EO2 to the NOR gate NO1.

A switch MOS is operably coupled with the mode setting button 3 and when the switch MOS is turned on, a High pulse is generated from the one shot multivibrator circuit OS1 to the NOR gate NO1.

Figure 4:
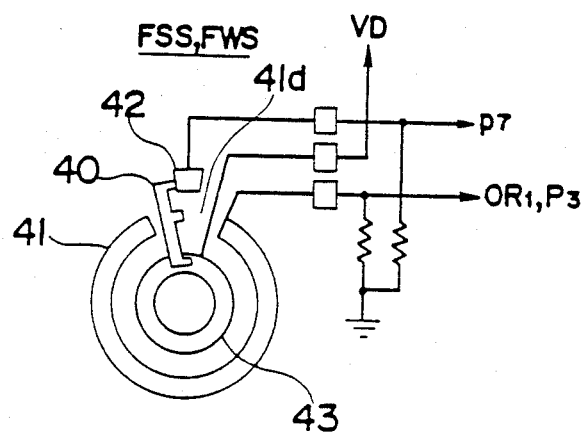
FIG. 4 is a top plan view showing an example of a switch for stopping film winding used in the camera shown in FIG. 1.

A switch MRWS is turned on when the photographic film is manually rewound. A switch ARWS is turned on when the photographic film brought into a stretched state during film winding. When any one of the switches MRSW or ARWS is turned on, the one shot multivibrator circuit OS2 generates a High pulse to the NOR gate NO1. S1 is a light measuring switch which is turned on when the release button 1 is depressed to the first depth. When the switch S1 is turned on, the output of the inverter IN1 is reversed to Low and a interruption signal is inputted to the terminal it$_1$ of the microprocessor MC. A switch FWS is turned on during film winding and the detailed construction of the switch FWS is shown in FIG. 4. A switch LES is turned on when a mechanism for picture taking (such as a lens moving mechanism) is started and is turned off when charge of the picture taking mechanism is completed. When any one of the switches FWS and LES is turned on, the output of the OR gate OR$_1$ becomes High, film winding is continued. FDS$_0$ is a switch which is turned off when the photographic film is wound on a film winding spool. FDS$_1$ is a switch disposed near a rail for the film winding and is turned off when the photographic film is preset in the position. When it is detected by the off state of any one of the switches FDS$_0$ and FDSqhd 1 that the photographic film is present in either position, the output of the AND gate AN$_2$ becomes Low. When the photographic film is not detected in any positions, both of the switches FDS$_0$ and FDS$_1$ are turned on and the output of the AND gate AN$_2$ becomes High, so that the one shot multivibrator circuit OS$_3$ generates a High signal. In this case if the rear lid of the camera is opened, the output of the one shot multivibrator circuit OS$_3$ is fed to the NOR gate NO$_1$ passing the AND gate AN$_0$. The switch FDS$_0$ disposed at the film winding spool can detects the photographic film even if the rear lid is opened. The switch FDS$_1$ disposed at the rail can not detect the photographic film when the rear lid is opened since the photographic film is not pushed by the rear lid. The switch FDS$_1$ is so provided that when the photographic film is retracted into the container leaving a suitable length of the leading portion of the photographic film exposed out of the film container, the switch FDS$_1$ is disengaged from the photographic film and is turned on. When the switch FDS$_1$ is turned on due to disengagement from the photographic film, the retraction of the photographic film into the container is stoppped. In other word, the photographic film is not completely retracted in the container.

A switch SPS is coupled with a follower sprocket which is rotated with the movement of the photographic film and the switch SPS is repeatedly turned on and off every time the photographic film advances a predetermined length. In case the switch SPS does not change its switching state for a predetermined period, it can be detected that there is a fault condition in retracting the photographic film. In a case where a hard photographic film is mounted in the camera, the leading portion of the film tends to be curved. Therefore, when the curved portion of the film comes to a driving sprocket which rotates to advance the film, the perforations of the photographic film may be disengaged from the teeth of the driving sprocket, whereby the photographic film can not be retracted despite that the driving sprocket rotates. Such condition as mentioned above is referred to as the fault condition. Under such fault condition, the switch FDS$_1$ disposed near the rail can detect the photographic film, the retraction of the film can be continued, whereby the power is wasted. The switch SPS is provided for preventing an erroneous operation when a particular photographic film such as a relatively hard film is used. The switch SPS is also provided for detecting undue voltage drop of the battery i.e., when the inner resistoance of the battery is increased, then the photographic film can not be advanced the predetermined length within a predetermined period of time.

FSS is a switch for detecting a stop position of the photographic film during film winding. The detail of the switch FSS is shown in FIG. 4 in which a slider 40 made of electrically conducting material is adapted to rotate along circular conductors 41 and 43 each formed coaxially on a substrate of a print circuit board by way of print circuit technique. The outer circular conductor 41 is interrupted at 41d. The slider 40 can be rotated in a clockwise direction in FIG. 4 one round each time one frame of the photographic film is advanced during film winding operation. When the photographic film is retracted, the slider 40 is rotated in a counter clockwise direction. When the film winding for one frame is completed, the slider 40 is positioned across the inner circular conductor 43 and a point conductor 42 disposed corresponding to an interrupted part 41d so as to conduct therebetween and the switch FSS is turned on. When the photographic film is advanced, the slider 40 leaves the point conductor 42 to turn off the switch FSS and the circular conductor 41 and 43 are conducted by the slider 40 to turn on the switch FWS. As the photographic film is advanced and when the slider 40 leaves the circular conductor 41 and the switch FWS is turned off, a motor MO for moving the photographic film is cut off from the power source and is braked to stop forwarding of the photographic film. After the motor MO is cut off from the power source and braked, the film is further wound by inertia of the film drive mechanism. The amount of the film winding by inertia is changed by the output power of the battery i.e., if the internal resistance of the battery is low (the battery is new) the amount of the film winding by inertia is large, on the contrary if the internal resistance of the battery is high, the amount of the film winding by inertial is small. Therefore, in case the interval between the end of the circular conductor 41 and the point conductor 42 is determined corresponding to the amount of the film winding by inertia for new battery, the slider 40 can not reach the point conductor 42 if the internal resistance of the battery increases. If the amount of the film winding by inertia is too small, the interval of the adjacent frames is shortened and in an extreme case, the two adjacent frames are overlapped. In order to prevent such defect, in the preferred embodiment, it is judged whether or not the switch FSS is turned on i.e., the slider 40 reaches the point conductor 42 after a predetermined period is lapsed from the power time during which the motor MO is cut off from the power source. If the switch FSS is not turned on after said predetermined period, the motor MO is driven again till the switch FSS is turned on i.e., the slider 40 reached the point conductor 42 to advance the photographic film.

In FIG. 3, S$_2$ is a switch which is turned on by depression of the release button 1 to the second depth, and when the switch S$_2$ is turned on, the microprocessor MC starts operation of photographing. COS is a switch operated by the film counter setting button 4 and is turned on when the film counter setting button 4 is depressed. When the switch COS is turned on, the one shot multivibrator circuit OS$_4$ generates a High pulse which is supplied to the interrupt terminal $it_2$ of the microprocessor MC through the inverter $IN_2$.

The motor control circuit MD is adapted to receive signals from the output terminals $p_{10}$, and $p_{11}$ so as to control the motor MO by the combinations of the signals of the terminals as follows:

When the terminals $p_{10}$ and $p_{11}$ are L, the motor MO is stopped and the photographic film is not moved.

When the terminals $p_{10}$ and $p_{11}$ are H and L, the motor MO is forwarded and the photographic film is advanced.

When the terminals $p_{10}$ and $p_{11}$ are L and H, the motor MO is reversed and the photographic film is retracted.

When the terminals $p_{10}$ and $p_{11}$ are H, the motor MO is cut off from the power source and is short circuited or braked and the photographic film is braked.

Figure 5:
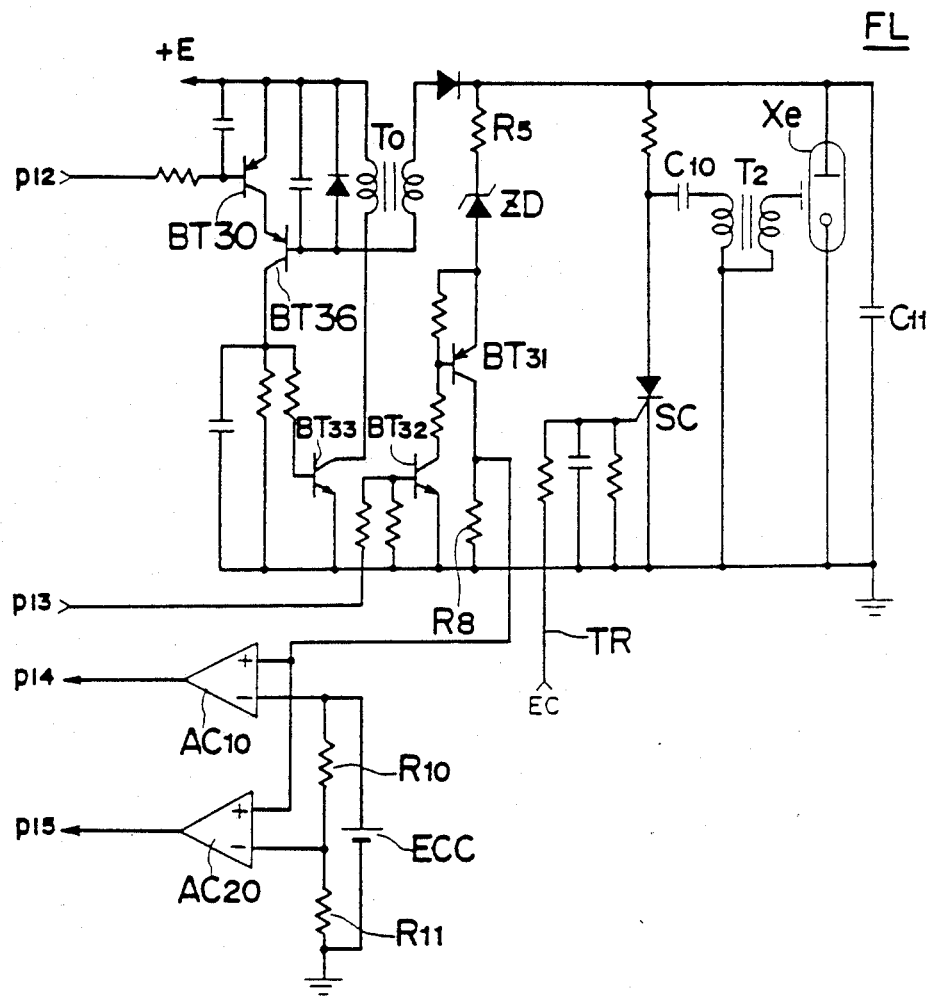
FIG. 5 is a circuit diagram showing an example of a control circuit for a flash light device used in the camera shown in FIG. 1.

A specific circuit diagram of the flash circuit FL is shown in FIG. 5, in which a transistor $BT_{30}$ is conducted when the terminal $p_{12}$ of the microprocessor MC is Low and a booster circuit composed of transistors $BT_{33}$, $BT_{36}$ and a transformer $T_0$ starts, whereby the boosted power from the booster circuit is charged in a main capacitor $C_{11}$. With a High signal at the terminal $p_{13}$ of the microprocessor MC, the transistors $BT_{31}$ and $BT_{32}$ are made conductive and a current passes through a series circuit composed of a resistor $R_5$, a zener diode ZD, a transistor $BT_{31}$ and a resistor $R_8$, and a voltage corresponding to the amount of charge charged in the main capacitor $C_{11}$ appears across the resistor $R_8$.

A comparator $AC_{10}$ has its reversed input terminal supplied with a reference voltage of a stabilized voltage source ECC and has its non reversed input terminal supplied with the voltage across the resistor $R_8$ and a comparator $AC_{20}$ has its reversed input terminal supplied with another reference voltage which is a division of the output voltage of the stabilized power source ECC divided by the resistors $R_{10}$ and $R_{11}$ and has its non reversed input terminal supplied with the voltage across the resistor $R_8$. When the voltage in the main capacitor $C_{11}$ is increased up to a voltage to emit enough light for assuring a picture taking under a predetermined guide number, the output of the comparator $AC_{20}$ is turned to High. The microprocessor MC effects to display a charge completion and to prevent a release lock by the High signal from the comparator $AC_{20}$. This state is referred to as preliminary charge completion state and abbreviated as PCS. In the present embodiment the main capacitor $C_{11}$ is further charged over PCS up to such a state that the comparator $AC_{10}$ turns its output to High. When the microprocessor MC detects the High signal of the comparator $AC_{10}$ through the terminal $p_{14}$ (this state is referred to as substantial charge completion state and abbreviated as SCS), the microprocessor MC makes the terminal $p_{12}$ High and terminal $p_{13}$ Low to turn off the transistors $BT_{36}$, $BT_{35}$ and $BT_{31}$ so as to stop charge in the main capacitor $C_{11}$ and stop detection of the charging operation in the main capacitor $C_{11}$. By stopping detection of the charging operation as mentioned above, main capacitor $C_{11}$ discharges only by self discharge, so that the voltage of the main capacitor $C_{11}$ is kept higher than PCS for a long time.

When the state of the main capacitor $C_{11}$ reaches PCS, the microprocessor MC starts to count a predetermined time such as 10 sec.. In case SCS is not achieved within 10 sec., the microprocessor MC stops charging in the main capacitor $C_{11}$ and detection of its charging and warns that the battery BA is worn off. In order to save the battery power, it may be arranged to drive the stabilized voltage source ECC, the resistors $R_{10}$ and $R_{11}$ and the comparators $AC_{10}$ and $AC_{20}$, only when the terminal $p_{13}$ is High by controlling the transistor $BT_{32}$ or another transistor (not shown) parallelly provided with the transistor $BT_{32}$.

When a trigger signal TR of a High pulse is applied to the gate of the thyristor SC through the automatic exposure control circuit EC during the exposure control, the thyristor SC is conducted and the charge in a capacitor $C_{10}$ is discharged and the Xenon lamp Xe is triggered to emit flash light discharging the charge in the main capacitor $C_{11}$.

A display control circuit DS shown in FIG. 3, the detail thereof will be explained with reference to FIG. 6 later, is connected with light emitting diodes $L_1$ to $L_4$ and a liquid crystal display device LC. LED $L_1$ is provided in the self timer display part 11. $L_2$ is a green LED which is turned on and off repeatedly during the normal photographing or picture taking mode. LEDs $L_3$ and $L_4$ are accommodated in one package and $L_4$ is green and $L_3$ is red. LED $L_4$ is turned on or turned on and off when the flash light picture taking is performed. LED $L_3$ is turned on and off in case there is required to use the flash light but PCS is not still completed. Since LEDs $L_3$ and $L_4$ are contained in one package, they can illuminate the same flash mark. These LEDs are provided so that they can be seen in a finder of the camera.

Figure 7:
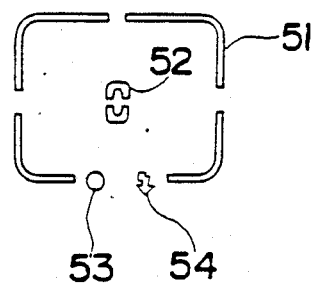
FIG. 7 is a front view of a finder used in the camera shown in FIG. 1.

FIG. 7 shows various patterns displayed in the finder. 51 denotes sight frames for showing an available sight area for picture taking. 52 denotes a distance measurement frame which occupies almost same area as the light receiving unit 9 for the automatic exposure control. 53 denotes a mark illuminated by the green LED $L_2$ for representing the normal picture taking under the ambient light. 54 denotes a mark illuminated by either LED $L_4$ of green or LED $L_3$ of red for displaying the flash light picture taking.

Figure 6:
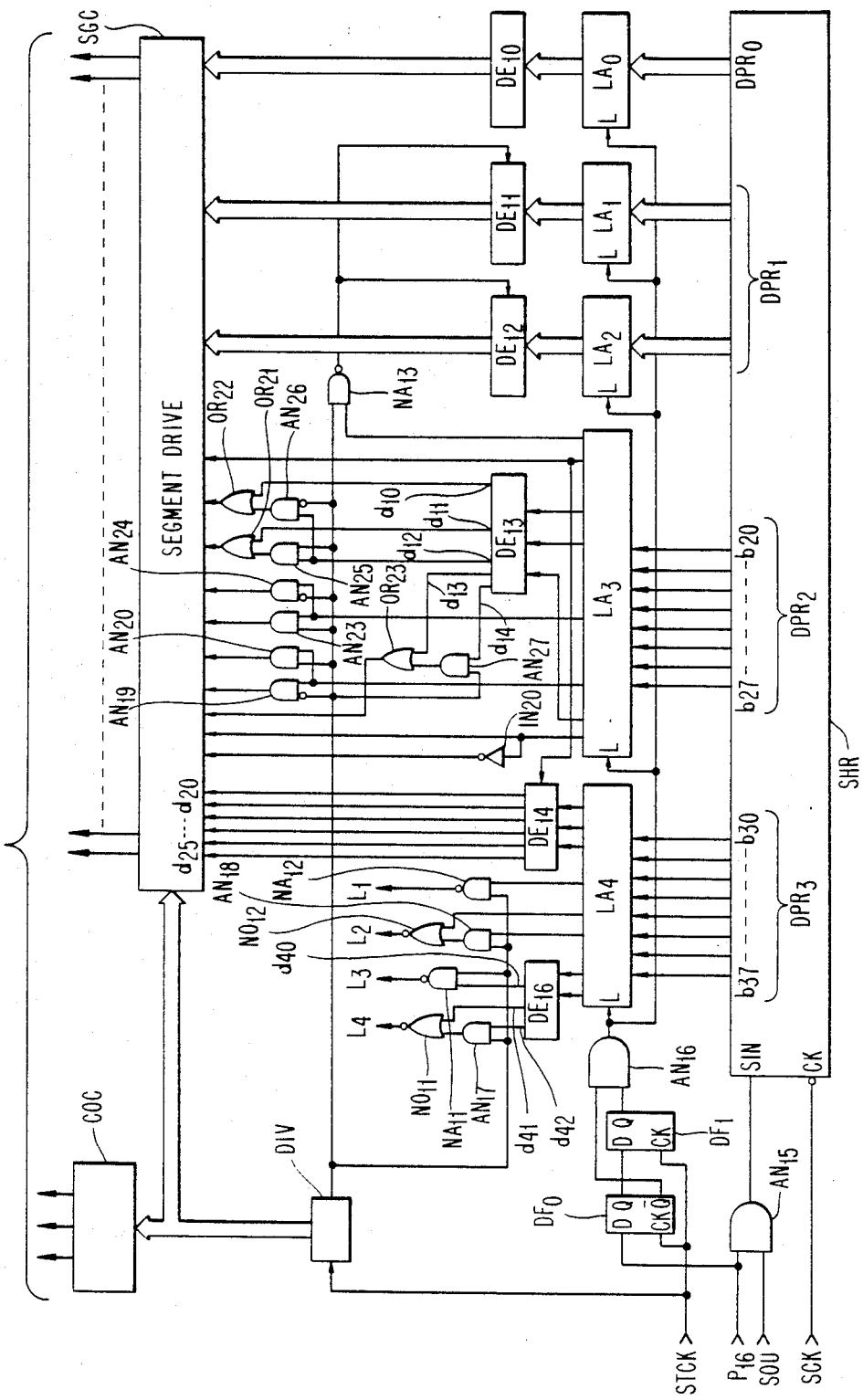
FIG. 6 is a circuit diagram showing an example of a control circuit for a display unit used in the camera shown in FIG. 1.

Referring to FIG. 6 showing the detailed circuit arrangement of the display control circuit DS which reads the data of 4 bytes sent from the microprocessor MC to control the LEDS $L_1$ to $L_4$ and liquid crystal display elements or LCDs in the display unit 2. The display data in the microprocessor MC is generated from the serial output terminal SOU of the microprocessor MC by one bit from the lowest or least significant digit to the highest or most significant digit through an input and output register IOR (not shown) and the display data is set in registers $DPR_0$, $DPR_1$, $DPR_2$ and $DPR_3$ of a shift register SHR synchronized with the positive going edge of the clock pulses fed from the terminal SCK. The data fed to the serial input terminal SIN is taken in the input and output register IOR synchronized with the negative going edge of the clock pulses from the terminal SCK. Eight clock pulses are output from the terminal SCK in one data transfer sequence. When the terminal $p_{16}$ of the microprocessor MC is High, an AND gate $AN_{15}$ is enabled to pass the display data coming from the terminal SOU. The output data from the AND gate $AN_{15}$ is taken in the shift register SHR synchronized with the negative going edge of the clock pulses from the terminal SCK. When 4 bytes of the data are generated from the microprocessor MC, the terminal $p_{16}$ is made Low. A pulse synchronized with the standard clock pulse STCK is generated from a circuit composed of D-type flip-flops $DF_0$ and $DF_1$ and an AND gate $AN_{16}$ each time the terminal $p_{16}$ falls to Low. The data taken in the shift register SHR is latched in latch circuits $LA_0$ to $LA_4$. Since the respective display data are transferred to the shift register SHR from the microprocessor MC in the sequence of $DPR_0$, $DPR_1$ ... $DPR_3$, the latch circuits $LA_0$ stores the data of the register $DPR_0$ and the latch circuit $LA_1$ stores four lower digits of the data of the register $DPR_1$, $LA_2$ stores four higher digits of the data of the register $DPR_1$. The latch circuits $LA_3$ and $LA_4$ store the data of the registers $DPR_2$ and $DPR_3$ respectively.

Table 1 shows the relation of the data stored in the registers $DPR_0$ to $DPR_3$ and the contents to be displayed on the display unit 2. The $b_{ij}$ in the table 1 represents the data stored in the j-th bit of the register $DPR_i$. The lower five bits of the register $DPR_0$, are set by the ISO sensitivity data which are transferred to a part of a segment driver SGC through a segment decoder $DE_{10}$ for displaying the ISO sensitivity data in the display part 30. Three higher bits of the register $DPR_0$ are spare bits.

The lower four bits and higher four bits of the register $DPR_1$ are provided for storing the data of the lower digit and higher digit of the display part 38 of the film counter respectively. The decoders $DE_{11}$ and $DE_{12}$ decodes the respective output of the latches $LA_1$ and $LA_2$ according to the rules shown in table 1. Specifically, with $0_H$ (the suffix H denotes BCD number), the display part 38 are made blank (all segments of the display part 38 are turned off). $1_H$ through $9_H$ are respectively assigned to the decimal number 1 through 9 respectively. $A_H$ is for the decimal number 0 and $B_H$ for a symbol "—". With the bit $b_{20}$ of the register $DPR_2$ is "0", the output of a NAND gate $NA_{13}$ is kept High, so that the decoders $DE_{11}$ and $DE_{12}$ keep the output data for driving the segments of the display part 38. The bit $b_{20}$ of the register $DPR_2$ is made "1" when the battery BA is exchanged but the film counter is not preset or when the battery BA is worn to such extent that the film can not be advanced one frame in a predetermined time or boost for flash lighting is not completed in a predetermined time, whereby the NAND gate $NA_{13}$ generates clock pulses which are reversed from the output pulses of a divider circuit DIV. The clock pulses are supplied to the control input terminals of the decoders $DE_{11}$ and $DE_{12}$, which output signals for disabling the display of the display part 38 when the output of the NAND gate $NA_{13}$ is Low, therefore the display part 38 is repeatedly turned on and off in response to the High and Low outputs of the NAND gate $NA_{13}$.

The bit $b_{21}$ is made "0" when the lens cover is closed, so that the display part 15 for displaying the camera name and the display parts 16, 18, 20, 22, 24 and 26 are turned off. When the lens cover is opened, the bit $b_{21}$ is made "1", the display parts 15, 16, 18, 20, 22, 24 and 26 are turned on to show that the exposure control is possible. The output of the bit $b_{21}$ is applied to the control terminal of a decoder $DE_{14}$. With "1" of the bit $b_{21}$, the decoder $DE_{14}$ generates the mode selection signal to display the selected frame among the frames 17 to 27. With "0" of the bit $b_{21}$, the decoder $DE_{14}$ ceases generation of the mode selection signal so that the frames 17 to 27 are turned off.

The bits $b_{22}$, $b_{23}$ and $b_{26}$ of the register $DPR_2$ are connected to the decoder $DE_{13}$. The relation between the outputs of the decoder $DE_{13}$ and the bits $b_{22}$, $b_{23}$ and $b_{26}$ is shown in table 2. The combinations of the data of the bits $b_{22}$, $b_{23}$ and $b_{26}$ are formed in the microprocessor MC. When the retraction of the film is completed, the combination of the data of the bits $b_{26}$, $b_{23}$ and $b_{22}$ is "1 1 1", the terminals $d_{12}$ and $d_{13}$ become High. When the terminal $d_{13}$ is High, the output of the OR gate $OR_{23}$ becomes High, and the display part 35 is turned on. When the terminal $d_{12}$ is High, the AND gates $AN_{25}$ and $AN_{26}$ are enabled, whereby the OR gates $OR_{21}$ and $OR_{22}$ generate pulses synchronized with the output of the divider DIV alternately to turn on and off the rear lid display parts 36 and 37 alternately for warning to open the rear lid and take out the photographic film from the camera. With "101" of the bits $b_{26}$, $b_{23}$ and $b_{22}$, the terrminals $d_{13}$ and $d_{11}$ becomes High. This state occurs when the photographic film is correctly mounted in the camera and the rear lid is closed. Under such state, the outputs of the OR gates $OR_{21}$ and $OR_{23}$ become High, whereby the film display part 35 and the rear lid display part 36 are turned on. When the rear lid is closed without the photographic film, the data of the bits $b_{26}$, $b_{23}$ and $b_{22}$ are "001" and the only the output of the terminal $d_{11}$ is made High to turn on only the rear lid display part 36.

When the rear lid is opened, data "010" is generated from the microprocessor MC independent from whether it is detected or not that the photographic film is mounted in the camera. Only the output of the terminal $d_{10}$ of the decoder $DE_{13}$ is made High so that the display part 37 is turned on for displaying that the rear lid is opened. In case it is once detected that the photographic film is mounted with the rear lid is opened, and then the rear lid is closed without removing the photographic film, the microprocessor MC feeds "100". In this case the terminals $d_{11}$ and $d_{14}$ of the decoder $DE_{13}$ are made High. When the terminal $d_{11}$ is High, the output of an OR gate $OR_{21}$ is made High to turn on the display part 36 for showing that the rear lid is closed. With the terminal $d_{14}$ to be High, the output pulses of the divider DIV are supplied to the segment driver SGC through an AND gate $AN_{27}$ and OR gate $OR_{23}$ to turn on and off repeatedly the display part 35 to warn that the rear lid is once opened with the photographic film mounted.

While the photographic film is wound, the bit $b_{24}$ is "1" and AND gates $AN_{23}$ and $AN_{24}$ are enabled. The outputs of both AND gate $AN_{23}$ and $AN_{24}$ are alternately made High, so that the display parts 33 and 34 are turned on and off alternately and repeatedly to show that the photographic film is now being wound up. When the photographic film is not being wound, the bit $b_{24}$ is "0" to turn off the display parts 33 and 34.

When the photographic film is being retracted or rewound, the bit $b_{25}$ is made "1", so that the AND gates $AN_{19}$ and $AN_{20}$ are enabled, then the outputs of the AND gates $AN_{19}$ and $AN_{20}$ generate High pulses alternately synchronized with the output pulses of divider DIV, whereby both of the display parts 31 and 32 are tuned on and off alternately and repeatedly to show that the photographic film is being retracted. When the photographic film is not being retracted, the bit $b_{25}$ is "0", and the display parts 31 and 32 are turned off.

The bit $b_{27}$ is "1" when the rear lid is closed and it is detected that the film container mounted in the camera is provided with signal output members, whereby the display part 29 is turned on to display that ISO sensitivity is read from the signal output members of the film container. Said bit $b_{27}$ is "0" when the film container is not mounted in the camera or there is not provided the signal output members of ISO sensitivity on the film container mounted in the camera, the output of the inverter $IN_{20}$ is made High, whereby the display part 28 is turned on to show that the ISO sensitivity now displayed is a fixed value.

The bits $b_{32}$ $b_{31}$ and $b_{30}$ change the outputs in any one of the combination of "001" to "110" depending on the photographing mode set in the camera as shown in the table 1. The decoder $DE_{14}$ outputs the signals shown in the table 3 by which any one of the frames 17 to 27 can be illuminated to display the exposure control mode. The bit $b_{33}$ is "0" during time counting of the self time mode and the NAND gate $NA_{12}$ allows to pass the clock pulses of the reversed output of the divider DIV, so that the LED $L_1$ is turned on and off repeatedly. The bit $b_{33}$ is "0" while it is not the period of the time counting of the self timer mode, so that the output of the NAND gate $NA_{12}$ is kept High and LED $L_1$ is turned off. The bits $b_{35}$ and $b_{34}$ are "01" in case the normal picture taking is possible under the ambient light picture taking mode. The bits $b_{35}$ and $b_{34}$ are "10" when the shutter speed is the lowest limit under the ambient light and are "00" when flash light picture taking mode. When the bit $b_{34}$ is "1", the output of the NOR gate $NO_{12}$ is "low", whereby the the green LED $L_2$ is turned on. When the bit $b_{35}$ is "1", the NOR gate $NO_{12}$ produces the clock pulses which are the reversed pulses of the divider DIV through the AND gate $AN_{16}$ and the green LED $L_2$ is turned on and off repeatedly.

The bits $b_{37}$ and $b_{36}$ are "11" when the normal flash light picture taking is possible, "01" when the normal flash light picture taking is possible but the distance of the photographic object is too long, "10" when PCS has not yet been completed and "00" for the normal picture taking mode. The decoder $DE_{16}$ produces the various outputs as shown in the table 4 depending on the data of the bits $b_{36}$ and $b_{37}$.

When the terminal $d_{41}$ of the decoder $DE_{16}$ is High, the output of the NOR gate $NO_{11}$ is Low and the green LED $L_4$ is turned on. When the terminal $d_{42}$ is High, the clock pulses of the divider DIV are passed the AND gate and are reversed by the NOR gate $NO_{11}$, so that the green LED $L_4$ is turned on and off repeatedly so as to warn that the distance of the photographic object is too long. When the terminal $d_{40}$ is High, the NAND gate $NA_{11}$ produces the clock pulses which are the reversed outputs of the divider DIV and the red LED $L_3$ is turned on and off repeatedly to warn that the charge in the flash circuit is not still completed. In FIG. 6, a circuit COC supplies a common signal for the common electrode of the liquid crystal display device LC of the display unit 2.

Referring to FIG. 3 again an oscillator circuit OSC generates the standard clock pulses STCK which are supplied to the microprocessor MC and the display control circuit DS. The automatic focusing circuit AC starts to measure the distance between the object and camera upon receipt of a High signal from the terminal $p_{26}$ of the microprocessor MC and stores the measured distance. The data of the measured distance is supplied to the automatic exposure control circuit EC. When the release magnet is driven, the lens moving mechanism starts to move the objective lens 10 and the switch LES is turned on. A lens pulse output circuit LP generates a pulse each time when the objective lens is moved a predetermined length. The automatic focusing circuit AC counts the number of the pulses generated from the circuit LP and compares the counted number of the pulses with the stored distance data, producing a signal to excite a magnet AM having a permanent magnet core to stop the lens, so that the objective lens is stopped in position corresponding to the detected distance.

Figure 8:
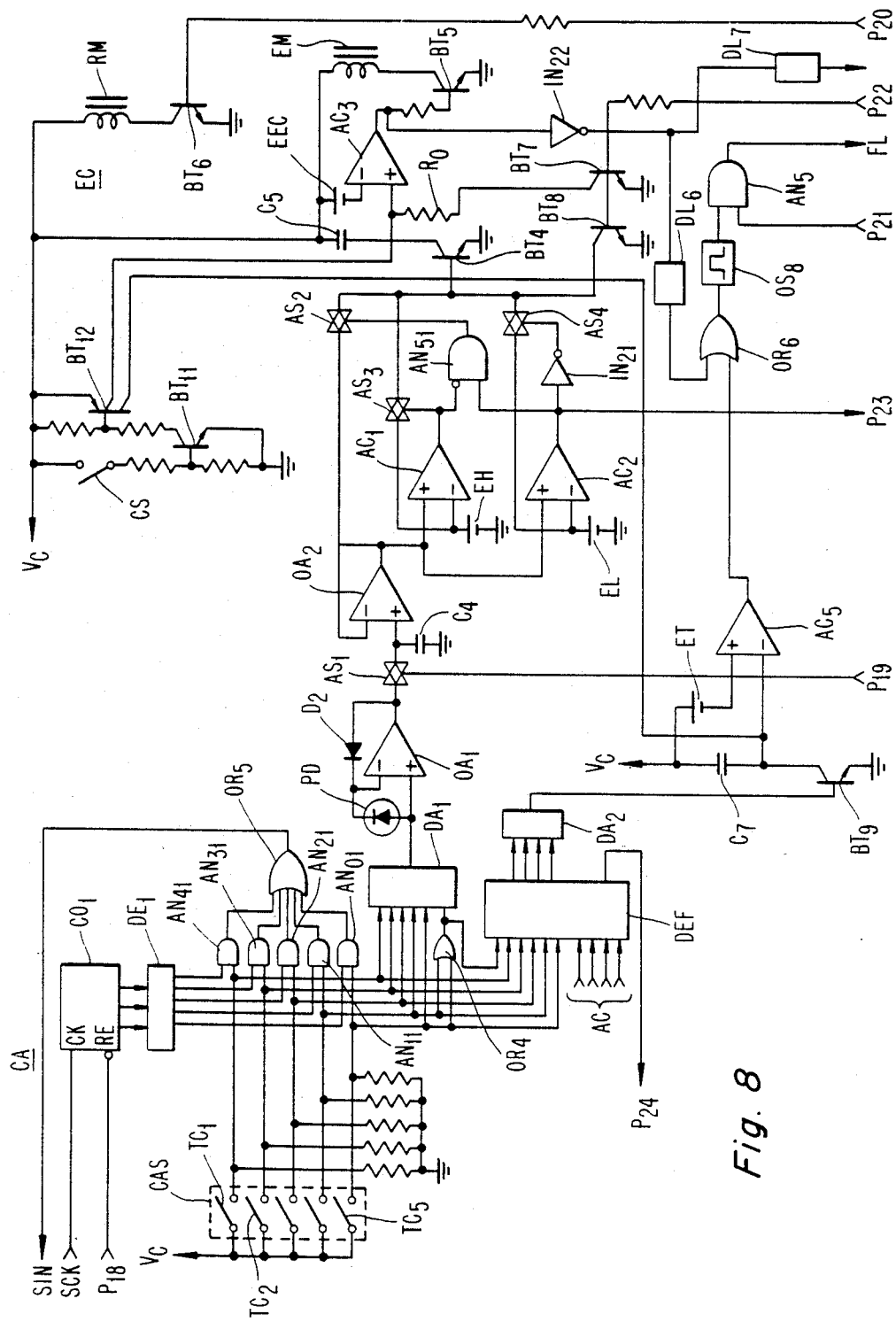
FIG. 8 is a circuit diagram showing a shutter control device used in the camera shown in FIG. 1, and FIGS. 9a to 9c, 10a, 10b and 10c, 11a to 11d, 12a, 12b, and 12c, 13a and 13b, 14a and 14b and 15 are flow charts showing operation of the camera according to the present invention.
Figure 9A:
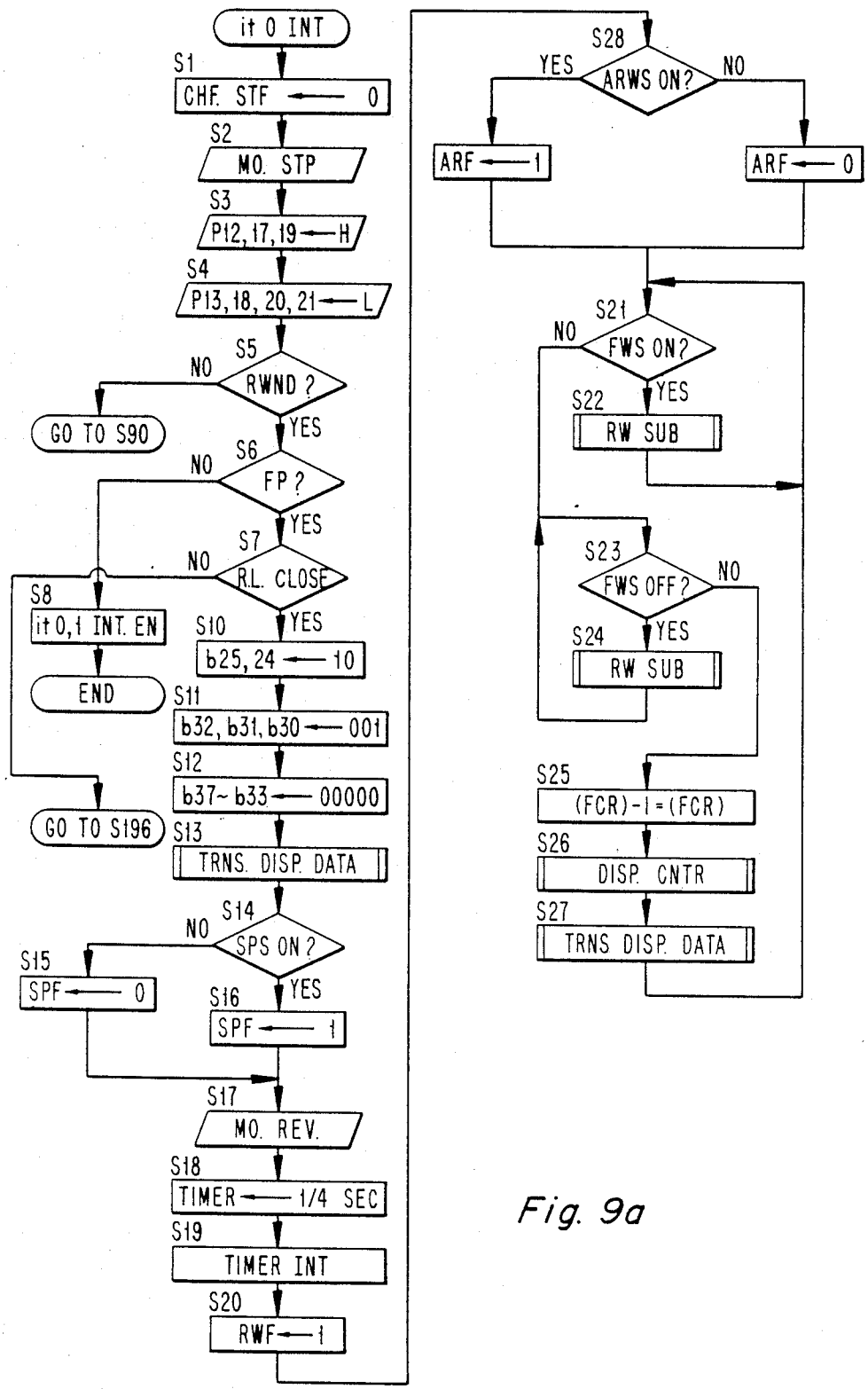
Figure 9C:
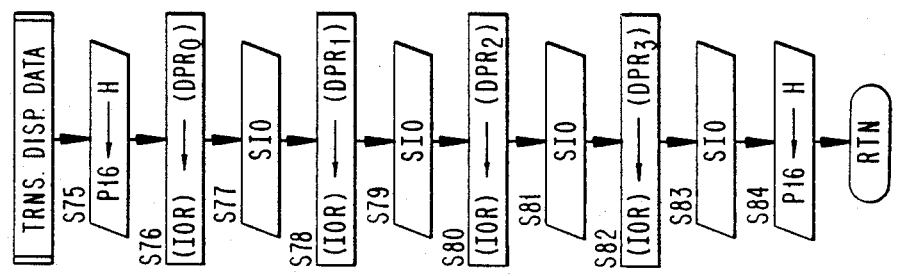
Figure 9B:
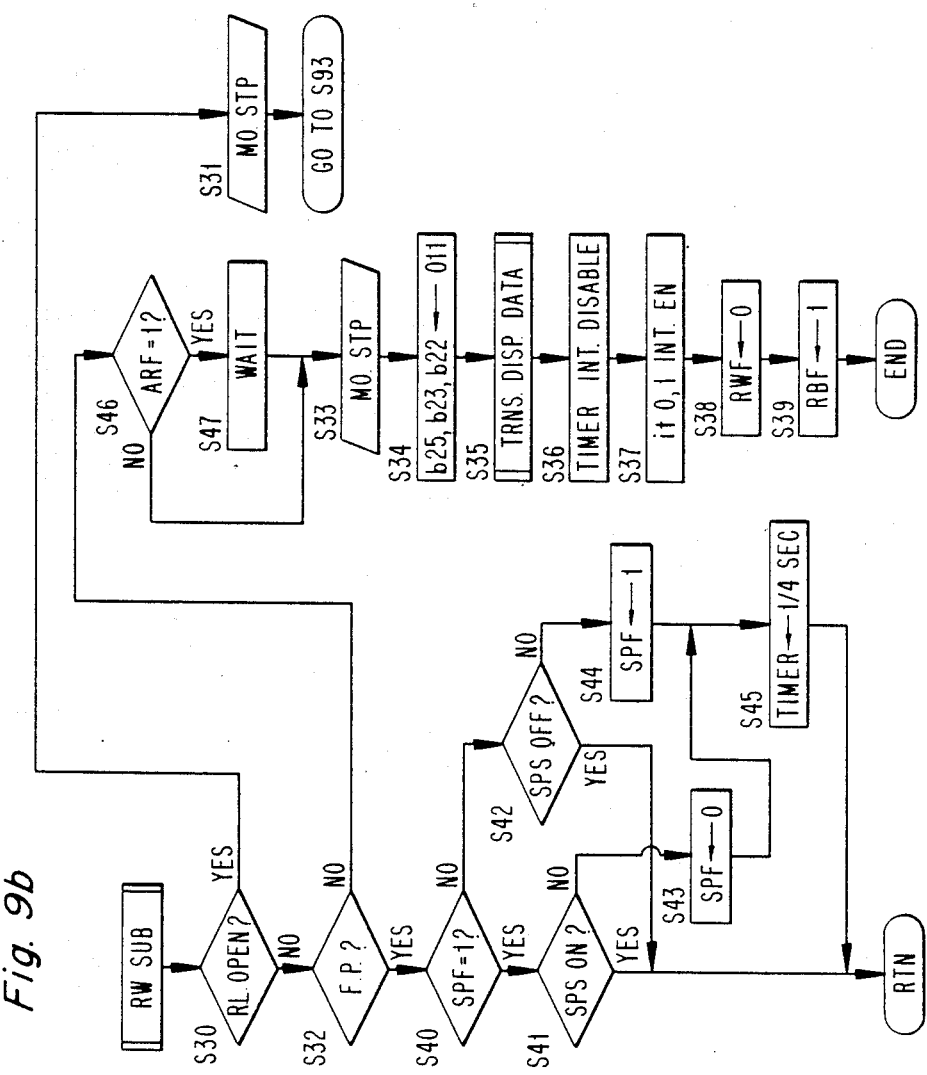
Figure 9D:
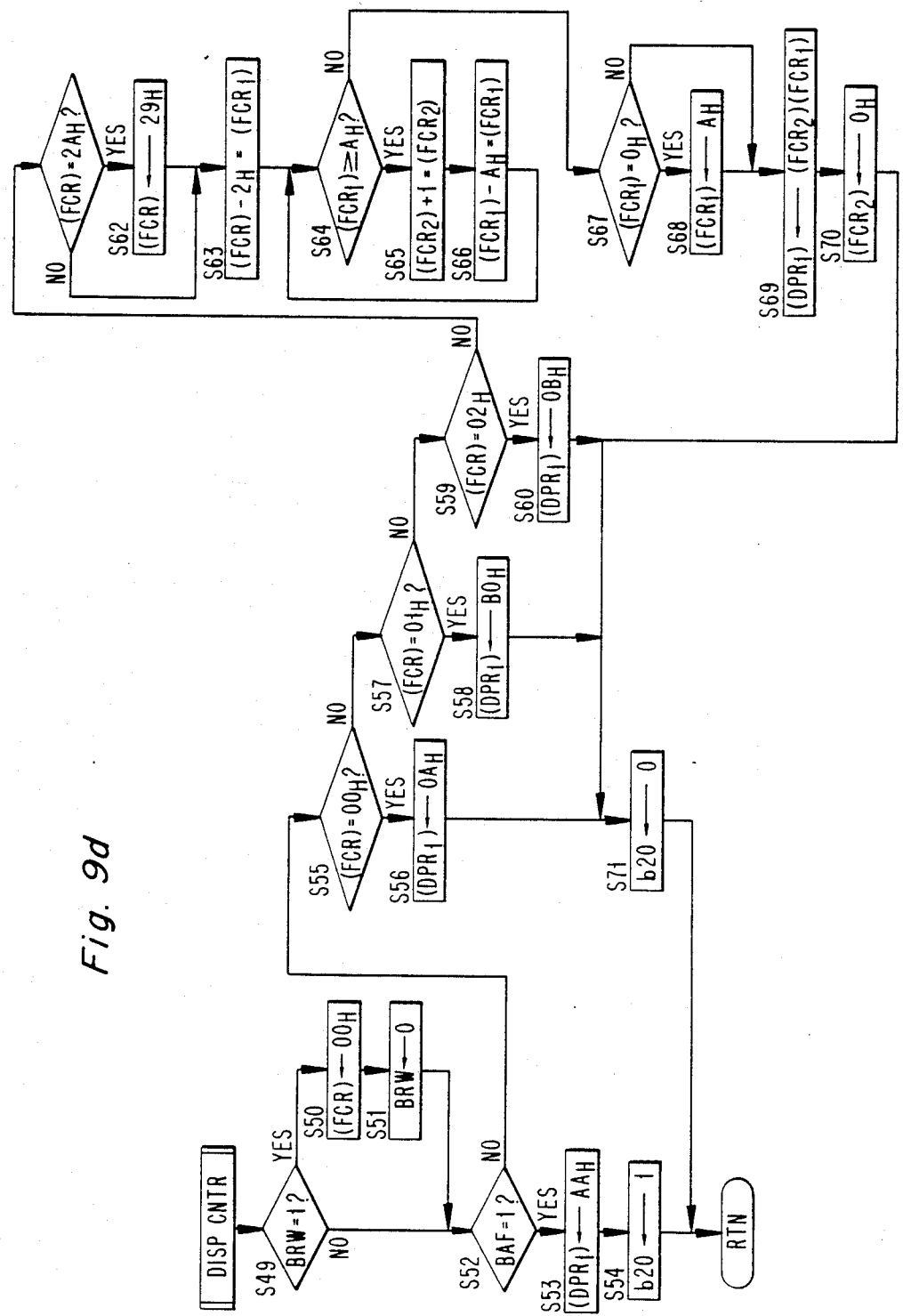

Referring to FIG. 8 showing the detailed circuit arrangement of the film sensitivity read circuit CA and automatic exposure control circuit EC. A switch group CAS having a plurality of contacts $TC_1$ to $TC_5$ for detecting the data provided on the outer surface of the film container. The ISO sensitivity is read by the combination of conductive state and non conductive state of the contacts $TC_1$ to $TC_5$.

A counter $CO_1$ is enabled when the terminal $p_{18}$ is High and counts the positive edge of the clock pulses from the terminal SCK. A decoder $DE_1$ enables respective AND gates $AN_{01}$ to $AN_{41}$ in turn corresponding to the content of the decoder $DE_1$ to output the state of the contacts $TC_1$ to $TC_5$. The outputs of the respective AND gates $AN_{01}$ to $AN_{41}$ representing the ISO sensitivity data are supplied to the serial input terminal SIN of the microprocessor MC through an OR gate $OR_5$. The circuit arrangement described above is labelled by CA. The remainder circuit is the automatic exposure control circuit EC. These circuits CA and EC are fed the power from the power source lines $V_D$ and Vc respectively.

The ISO sensitivity data generated from the switch group CAS is fed to a digital to analog converter $DA_1$. It is noted that any one of the lowest two bits of the coded signal of the ISO sensitivity data is "1". Accordingly when the ISO sensitivity data is read from the film container, the output of an OR gate $OR_4$ is made High, on the other hand, when the ISO sensitivity data is not read, the output of the OR gate $OR_4$ is made Low. The DA converter $DA_1$ converts the ISO sensitivity data of five bits fed from the switch group CAS to analog signal when the output of the OR gate $OR_4$ is High. When the output of the OR gate $OR_4$ is Low, the DA converter $DA_1$ generates an analog signal representing the fixed sensitivity data of ISO 100. The outputs of the switch group CAS and OR gate $OR_4$ and the distance data of the automatic focusing circuit AC are supplied to a decoder DEF for the flashmatic control. In this embodiment, the light amount of the flash light for the flashmatic control is fixed, when the aperture value reaches a suitable value corresponding to the distance and ISO sensitivity data, the flash light is emitted. Since the shutter employed in the camera in this embodiment is a lens shutter, the time counted from the beginning of shutter opening corresponds to the shutter aperture value, the decoder DEF generates a time data defined by the ISO sensitivity data and the distance between the photographic object and the camera. When the output of the OR gate $OR_4$ is Low, a time data defined by the ISO sensitivity data of ISO 100 and the distance is produced. The time data from the decoder DEF is converted into the analog signal in the DA converter $DA_2$. When the combination of the ISO sensitivity data and the distance is such extent that the amount of the flash light is insufficient against the maximum aperture value, the decoder DEF supplies a High signal to the input terminal $p_{24}$ of the microprocessor MC so as to turn on and off repeatedly LED $L_4$ for warning the insufficient light.

The analog signal representing the ISO sensitivity data fed from the DA converter $DA_1$ is supplied to the non-inverted input terminal of an operational amplifier $OA_1$ for the light measurement.

A light receiving element PD is connected across both input terminals of the operational amplifier $OA_1$ and the current flowing the light receiving element PD is logarithmically compressed by a diode $D_2$, whereby the output of the operational amplifier $OA_1$ outputs $Bv+Sv=Ev$.

When a period of sufficient time during which the power of the line Vc is supplied and the light measurement circuit is stabilized and the automatic focusing circuit AC stores the distance data is lapsed, the microprocessor MC makes its output terminal $p_{19}$ Low, whereby an analog switch $AS_1$ is turned off and capacitor $C_4$ stores the output of the operational amplifier $OA_1$ or the light measurement circuit.

A reference voltage source EH produces a reference voltage corresponding to a maximum Ev value $E_{VH}$ with a maximum stop down aperture value and the shortest exposure time. A reference voltage source EL produces a reference voltage corresponding to an Ev value $Ev_L$ with a full-open aperture value and a limit exposure time that the camera shake does not appear on the photograph. The relations of the output values of the comparators $AC_1$ and $AC_2$, the AND gate $AN_{51}$, analog switches $AS_2$, $AS_3$ and $AS_4$ and Ev value to be controlled are shown in the table 5.

The output of the comparator $AC_2$ is connected to the input terminal $p_{23}$ of the microprocessor MC so that the terminal $p_{23}$ is made Low when Ev is smaller than $E_{vL}$. If the camera is set to the normal picture taking mode or the self timer mode, the ambient light picture taking mode is changed to the flash light picture taking. The Ev signal supplied from any one of the analog switches $AS_2$, $AS_3$ and $AS_4$ is inputted to the base of a transistor BT4. The analog signal from the DA converter $DA_2$ representing the timing of trigerring the flash light is input to the base of the transistor $BT_9$. When the microprocessor MC detects that it is possible to progress the exposure control upon closure of the release switch $S_2$, the terminal $p_{20}$ of the microprocessor MC is made High, whereby the transistor $BT_6$ is conducted predetermined period resulting in exciting the release magnet RM to start the lens and exposure control. Upon opening the shutter, the count switch CS is turned off to cause the transistors $BT_{11}$ and $BT_{12}$ to be non conductive. Then a capacitors $C_5$ and $C_7$ are charged by the respective collector current of the transistors $BT_4$ and $BT_9$. When the voltage of the capacitor $C_5$ reaches the reference voltage of a constant voltage source EEC, the output of a comparator $AC_3$ is reversed to Low and a transistor $BT_5$ is turned off to deenergize the magnet EM, whereby the shutter is closed.

When the picture is taken with the flash light, the terminal $p_{21}$ of the microprocessor MC is made High to enable an AND gate $AN_5$. When a period of time during which the aperture diaphragm is opened to such an extent as to obtain the desired light amount by the flash light is lapsed, the output of a comparator $AC_5$ is reversed to Hihg. This causes the output of an OR gate $OR_6$ to be High, and in turn a one shot multivibrator circuit $OS_8$ generates a High pulse, which is passed an AND gate $AN_5$ to the flash circuit FL to emit the flash light. In case the shutter starts to close before the aperture diaphragm reaches the desired aperture value under the flashmatic control due to a high shutter speed, the state of the comparator $AC_3$ is reversed before the reverse of the comparator $AC_5$, the output of an inverter $IN_{22}$ is made High by the Low state of the comparator $AC_3$. After lapse of time of a delay circuit $DL_6$ which acts to compensate the delay of the shutter mechanism, the output of an OR gate $OR_6$ is made High to cause a one shot multivibrator circuit $OS_8$ to generate a pulse to emit the flash light.

In the close picture taking mode, the terminal $p_{22}$ of the microprocessor MC is made High, whereby the transistor $BT_4$ is non conducted but the transistor $BT_7$ is conducted to close the shutter after lapse of a delay time defined by the capacitor $C_5$ and resistor $R_0$. Said delay time corresponds to the period of time of the highest shutter speed with the maximum stop-down aperture value. In this case, the terminal $p_{21}$ is High and the flash light is turned on when the shutter starts to close. Accordingly, in the close picture taking mode, the aperture size is reduced as small as possible to make the depth of the focus deep and the flash light is emitted to compensate the insufficient light value of the ambient light. In case where an operator wishes to take a picture of a farther object, possibility of under exposure increases. In order to prevent the under exposure as mentioned above, the transistors $BT_7$ and $BT_8$ and the resistor $R_0$ may be omitted so as to control the camera under the fill-in flash mode by making the terminal $p_{21}$ High in the close picture taking mode. By such arrangement as described above, under exposure may be prevented since the shutter is controlled under the ambient light and when the close object is to be photographed, since the distance data detected in the automatic focusing circuit AC is a close one, the flash is emitted with the relatively small aperture size and the depth of focus may be made deep.

When a period of time for completely closing the shutter after the shutter close is started is lapsed, the output of a delay circuit $DL_7$ becomes High and a signal representing that the shutter is completely closed is supplied to the terminal $p_{25}$ of the microprocessor MC, whereby the microprocessor MC starts to charge the exposure mechanism and the lens moving mechanism to wind up the film of one frame.

The detailed operation of the microprocessor MC will be described hereinafter.

The microprocessor MC is provided with the interrupt input terminals $it_0$, $it_1$, $it_2$, and reset terminal RES and the order of the priority is RES, $it_0$, $it_1$, 2. The microprocessor MC is provided with an internal timer for counting the internal clock pulses so that when the count data of the internal timer reaches a preset value, the timer interruption is enabled. When any one of the terminals RES and $it_0$, $it_1$, $it_2$, $it_3$ receives an interruption, the microprocessor MC is set to ready state and performs any one of the interruption according to the instructions fed from the ROM. While one of the interruption is executed other interruption is not entered in the microprocessor MC but a flip-flop is set to store the fact that the other interruption is requested. When the prior interruption is completed, the other interruption can be entered in the microprocessor MC. The timer interruption is allowed only when timer interruption is enabled.

The operation of the closure of the rear lid is explained first. When the rear lid is closed, the switch BKS is opened and an interruption signal is applied to the terminal $it_0$ through the exclusive OR circuit $EOR_2$, NOR gate $NO_1$. Then the microprocessor MC operates the program shown in FIG. 9 from the step s1, wherein flags CHF and STF are reset and the terminals $p_{10}$ and $p_{11}$ are made High to stop the motor MO. Also terminals $p_{12}$, $p_{17}$ and $p_{19}$ are respectively made High, stopping the boost of voltage in the flash circuit and supply of the power to the line Vc and releasing the locked state of the automatic exposure control. The terminals $p_{13}$, $p_{20}$ and $p_{21}$ are made Low in the step s4, the microprocessor MC stops the detection of the charge in the capacitor $C_{11}$, disabling the flash light emission and resetting the release terminal $p_{20}$. The operations mentioned above are preliminary ones for disabling the operation of the camera performed due to an accidental interruption applied to the terminal $it_0$.

After the operations mentioned above are executed, the program flow goes to s5, wherein it is judged whether or not the photographic is advanced or retracted by the switches ARWS and MRWS. When the photographic film is not retracted or the switch MRWS is turned off, the program flow goes to s90 shown in FIG. 10. In the step s90, it is judged whether or not the rear lid is opened. Assuming that the rear lid is closed, the program flow goes to s92 to judge whether the flag RFB is "0". The flag RFB is "1" when the rear lid is closed (step s118) and "0" when the rear lid is opened (step s93). In case "0" of the flag RBF is detected in the step s92, it shows that the rear lid has been opened and is closed and the program flow goes to s118. In case it is detected that the rear lid is closed in the step s90 and that the flag RBF is "1" in the step s92, the program flow goes to s190 shown in FIG. 11 to seek that what interruption to the terminal $it_0$ is requested. In the step s118 the flag RBF is set to "1" and the program flow goes to the step s121, wherein it is judged whether or not the photographic film is mounted in the camera by the signal of the switches $SDF_0$ and $SDF_1$, and when the photographic film is mounted the program flow goes to the step s122, when the photographic film is not mounted, the program flow goes to the step s127. In the step s127, the data "01" is set in the bits $b_{22}$ and $b_{23}$ and the data "0001" is set in the bits $b_{24}$ to $b_{27}$, so that the display part 36 (referred to as lid closure display) for showing that the rear lid is closed, the display parts 33 and 34 (film advance display) for showing that the photographic film is being advanced one frame and the display part 28 (ISO sensitivity display) for the ISO sensitivity are displayed, then the program flow goes to the step s129. On the other hand, it is judged in the step s122 whether the flag FEF is "1". The flag FEF is made "1" in case the rear lid is opened with the photographic film mounted in the camera (step s95). When the flag FEF is "1", the bits $b_{22}$ and $b_{23}$ are made "00" and the bits $b_{24}$ to $_{27}$ are made "0101", so that the lid closure display 36, film advance display 33 and 34 and ISO sensitivity display 28 are respectively displayed and the film mounting display 35 is alternately turn on and off, then the program flow goes to the step s129.

When it is detected that the flag FEF is "0" in the step s122, the lid closure display 36, film mounting display 35 and ISO sensitivity display 28 are made ready to display in the steps s125 and s126 and the program flow goes to the step s129.

In the step s129, the bits $b_{32}$, $b_{31}$ and $b_{30}$ are set to "001" so as to set the camera in the normal picture taking mode, turning on the normal picture taking mode display 17. In this case the bits $b_{33}$ to $b_{37}$ are set by "00000" so as to make the LEDs $L_1$ to $L_4$ off. Then the flag BAF is made "0" in the step s132 and in turn the program flow goes to the step s133. The flag BAF is made "1" when the battery BA is exchanged with the photographic film remained in the camera (s432). The flag BAF is provided for warning that the data of the film frame number stored in the film counter is lost. Therefore, in case the rear lid is closed from the opened position, it is assumed that the photographic film is exchanged and since warning is not necessary the flag BAF is reset to "0".

The step s133 is a sub routine for transferring the display data to the display control circuit DS. The detail of the sub routine is shown the steps after s75 in FIG. 9.

Referring to FIG. 9, the terminal $p_{16}$ is made High in the step s75 so as for the display control circuit DS ready to receive the display data. And the contents of the register $DPR_0$ are set in the register IOR. The data of the register IOR is transferred to the display control circuit DS in series. The contents of the registers $DPR_1$, $DPR_2$ and $DPR_3$ are transferred to the display control circuit DS in a similar manner as mentioned above and in turn the terminal $p_{16}$ is made Low in the step s84.

When the transfer of the display data is completed, the program flow goes to the step s134 for the film winding sub routine. The details of the film winding sub routine are shown in the steps after s165 in FIG. 10. In the step s165, a flag WF is set to "1" to show that the photographic film is being wound. Then an interruption timer is set by 2 seconds in the step s166 to enable the timer interruption. Subsequently, the terminal $p_{10}$ is made High and $p_{11}$ Low in the step s168 to start the motor MO for film winding. The step s169 is provided to wait for turning on of the film winding detection switch FWS. When the film winding detection switch FWS is off, the program flow goes to the step s170 to detect whether the switch ARWS is turned on due to film stretch and whether the switch MRWS is turned on by the manual film rewinding.

In case of directly after the picture taking, since a switch LES coupled with the picture taking mechanism is turned on, the output of the OR gate $OR_1$ is High, the program flow goes to the step s171 even if the switch FWS is turned off. The step s171 is provided to wait the switch FWS is turned off again. The same operation as performed in the step s170 is executed in the step s172.

When it is detected in the step s171 that the switch FWS is opened, the terminals $p_{10}$ and $p_{11}$ are made High to brake the motor MO. Then the timer interruption is disabled in the step s174, the program flow waits for a predetermined period of time in the step s175. Said predetermined time is set to 50 m sec for example corresponding to the time necessary to completely stop the film winding after the motor MO is braked. When said predetermined time is lapsed, the program flow goes to the step s176. The switch LES coupled with the picture taking mechanism is surely turned off before the film winding switch FWS is turned off. It is detected in the step s176 whether or not the switch FSS for defining the stop position of the film winding is turned on and with on of the switch FSS, the terminals $p_{10}$ and $p_{11}$ are made Low in the step s183 to turn off the motor MO and the flag WF is reset to "0" in the step s184, then the program flow goes to "RETURN".

When the switch FSS is turned off due to consumption of the battery BA, this is detected in the step s176 and the program flow goes to the step s177 to preset the interruption timer by ¼ sec. to enable a timer interruption and the terminal $p_{10}$ is made High, $p_{11}$ Low to start the motor MO again. Then the program flow waits until the film winding stop position detecting switch FSS is turned on in the step s180. When it is detected that the switch FSS is turned on, the timer interruption is disabled in the step s181 and the motor MO is braked for 50 msec. and then the motor is turned off to stop the film winding and the flag WF is reset to "0" and the program flow goes to RETURN.

When it is detected in any one of the steps s170, s172 and s185 that the film rewinding switches ARWS and MRWS are turned on during film winding, the film winding is stopped in the step s186 similar to the step s182. Then the timer interruption is disabled and the program flow goes to the step s6 to execute the film rewinding routine.

In case the switch FWS is not turned off in 2 sec. or the switch FSS is not turned on in ¼ sec. due to wearing of the battery BA, the timer interruption is executed and the program flow performs the steps after s245 shown in FIG. 11. In the step s245, it is judged whether or not the flag WF showing the film winding is "1". With "1" of the flag WF, the motor MO is stopped in the step s246 to stop the film winding. Then the bit $b_{20}$ is made "1" to cause the film counter display 38 to be turned on and off repeatedly. The bit $b_{24}$ is made "0" to turn off the film winding displays 33 and 34. Also the bits $b_{30}$ to $b_{32}$ are made "001" to set the camera in the normal picture taking mode, and the bit $b_{21}$ is made "0" so as to turn off the display parts 15, 16, 17, 18, . . . 26 and 27. The display data is transferred to the display control circuit DS then the microprocessor MC stops inhibiting all interruptions. Accordingly the camera can not be operated so far as the battery BA is replaced by a good battery. Since the film counter display 38 is only turned on and off, only the warning that the camera can not be used is displayed.

When the sub routine for the film winding is completed, subsequently 1 is added in the film counter register FCR in the step s135. The register FCR is reset to 0 when the rear lid is opened (step s97). The program flow goes to the sub routine s136 for displaying the film counter. The details of the sub routine s136 are shown in the steps after s49 in FIG. 9. Table 6 shows the relation of the contents of the flags BRW and BAF and the registers FCR and $DPR_1$.

In the step s49, it is judged whether the borrow BRW is "1" during the calculation of the (FCR)−1=FCR in the step s25. The borrow occurs when the amount of the film rewinding is greater than the amount of the film winding after closure of the rear lid. When the borrow is "1", the register FCR is set to "$00_H$" in the step s50 and the borrow BRW is reset to 0 in the step s51 then the program flow goes to the step s52.

In the step s52, it is judged whether or not the flag BAF is "1" and with "1", the program flow goes to the step s53 and with "0" program flow goes to the step s55. The flag BAF is made "1" when the battery BA is interchanged with the rear lid closed and the photographic film mounted in the camera but the film counter is not preset. In case the flag BAF is "1", the display register $DPR_1$ is set by $AA_H$ to display "00" and the bit $b_{20}$ is set by "1" to turn on and off the film counter 38 and the program flow goes to the RETURN.

In case the flag BAF is "0", it is judged whether the content of the register FCR is "$00_H$" in the step s55 and with "$00_H$", the register $DPR_1$, is set by $OA_H$ and the bit $b_{20}$ is set set by "0" so as to display "0" in the film counter 38. If it is detected in the step s55 that the register FCR is not "$00_H$", it is detected whether FCR is "$01_H$" in the step s57. With "$01_H$", the data $BO_H$ is set in the register $DPR_1$, to display "−" in the step s58 and the program flow goes to RETURN. With not "01", it is judged in the step s59 whether the register FCR is "$02_H$". With "$02_H$", the register $DPR_1$, is set by $OB_H$ to display "−" so as to represent the photographic film is preliminarily being wound, and the program flow goes to RETURN through the step s71. With not "$02_H$" of the register FCR, the program flow goes to the step s61, wherein it is judged whether the content of the register FCR is "$2A_H$". When the content of the register is "$2A_H$", since the content to be displayed on the film counter exceeds 39, the contents of the register FCR is set to "$29_H$" for displaying "39" in the film counter 38 and the program flow goes to the step s63. On the other hand, if the content of the register FCR is not "$2A_H$", the program flow goes to the step s63, wherein a result of decrement by $2_H$ which corresponds to the number of the film counter of the preliminary film winding from the actual content of the register FCR is set in the register $FCR_1$ and the calculation of the display data is performed in such a manner that it is first detected what times are the contents of the register $FCR_1$ to "$A_H$" and one of "0" to "3" are set in the register $FCR_2$ i.e., the position of 10 in terms of a decimal number and any one of "0" to "9" is set in the register $FCR_1$ i.e., the position of 1. In the step s67, it is judged whether the contents of the lower four bits of the register $FCR_1$ is "$0_H$" and with "$0_H$", "$A_H$" is set in the register $FCR_1$ so as to display "0" in the step s68. If the lower four bits of the register $FCR_1$ is not "$0_H$", the program flow goes to the step s69 directly. In the step s69, the data in the lower four bits of the register $FCR_2$ is stored in the upper four bits of the register $DPR_1$ and the data in the lower four bits of the register $FCR_1$ is stored in the lower four bits of the register $DPR_1$. Then the lower four bits of the register $FCR_2$ are set by "$0_H$" in the step s70 and the bit $b_{20}$ is set by "0" in the step s71 so as to display "0" on the film counter 38.

The operation at the time of closure of the rear lid is explained hereinafter with reference to FIG. 10. When the sub routine s136 of the display of the film counter 38 is completed, the display data is transferred in the step s137 and it is judged in the step s138 whether or not the rear lid is opened during the preliminary film winding. If the rear lid is opened during the prelimnary film winding, the program flow goes to the step s1 and the motor MO is stopped, then the program flow goes to the step s93.

If it is detected that the rear lid has not been opened, it is judged in the step s139 whether the contents of the register FCR is not "$3_H$". In case the contents of the register FCR is "$3_H$", the subsequent film winding is made in the step s134. When it is detected that the preliminary film winding is already completed and the contents of the register FCR is "$3_H$", the bit $b_{24}$ is made "0" to turn off the film winding display 33 and 34 in the step s140. In the subroutine s142 the data of the film container is read. The film winding of one frame must be completed before the step s142. In reading the data of the film container after the film winding of one frame is completed, there is a possibility of an incomplete contact between the contacting member for reading the data on the container and the container due to the movement of the film container, whereby an erroneous data reading may occur. In order to prevent the drawback, there is provided a step s141 for waiting for a predetermined time until the container becomes stationary.

After a predetermined time is lapsed in the step s141, the sub routine for reading the ISO sensitivity data is executed. This sub routine is shown in the steps after s150. The terminal $p_{18}$ is made High in the step s150 to enable the film sensitivity read circuit CA. Then the ISO sensitivity data is read from the film container in the step s151 and the read data is transferred to the register SVR in the step s151. Then it is detected whether or not the data read has "1" at least one of the lowest two bits of the ISO sensitivity data. In case the film container having members of the ISO sensitivity data on the container is mounted in the camera, one of the lowest two bits is "1", and therefore, the program flow goes to the step s155, wherein the bit $b_{27}$ is made "1" so as to display that the display 29 of the ISO sensitivity data in the container can be successfully read and the read ISO sensitivity data is set in the register $DPR_0$, and the program flow goes to RETURN. When it is detected that none of the lowest two bits of the data read from the container is not "1" in the steps s153 and s154 which represents that a film container without ISO sensitivity data output members or no film container is mounted in the camera, the program flow goes to the step s157, wherein the bit $b_{27}$ is made "0" and the data corresponding to the ISO sensitivity data of ISO 100 is set in the register SVR and the data is transferred to the register $DPR_0$.

When the ISO sensitivity data read routine of the step s142 is completed, the display routine of the step s143 is performed and the interruption to the terminals $it_0$ and $it_1$ is enabled and the program flow goes to the steps after s215 for the boosting operation of voltage for emitting the flash light. In the step s215, the terminal $p_{12}$ is made Low to start the boosting and the charge voltage across the main capacitor $C_{11}$ of the flash circuit FL is measured in the step s216. The interruption to the terminal $it_1$ is enabled in the step s217 for opening the lens cover and the program flow goes to the step s218, wherein the flag CHF is set to 1 for representing that the boosting in the flash circuit is performed. The step s219 is provided for waiting until the voltage across the capacitor $C_{11}$ reaches such value that the flash light can emit sufficient amount of light namely PCS is completed. When the PCS is completed, the data of the interruption timer is set by 10 seconds in the step s220 to enable the timer interruption. The program flow goes to the step s222 wherein it is judged whether or not SCS is completed. When SCS is completed in 10 seconds after PCS is completed, the boosting operation in the flash circuit is stopped in the step s223 and the detection of the charge voltage of the main capacitor $C_{11}$ is stopped in the step s224, resetting the flag CHF to 0 in the step s225, then the timer interruption is disabled in the step s226 to go to END of the boosting routine.

If SCS is not completed in 10 seconds after PCS is completed, the timer interruption is executed when 10 seconds is lapsed to perform the step s245. Since the flag CHF is 1, the program flow goes to the step s266 through s245 and s253 to stop the boosting operation and the detection of the charged voltage across the capacitor $C_{11}$ is stopped. Then the flag CHF is reset to 0. In the step s269, the film counter display 38 is turned on and off by making the terminal $b_{20}$ "1" to warn that the battery BA is consumed. Then the display data is transferred in the step s270 and the interruption to the terminals $it_0$ and $it_1$ is enabled and the program flow goes to the step s359 shown in FIG. 12 to detect whether the light measurement switch $S_1$ is turned on. When the switch $S_1$ is turned off, the sub routine s361 is performed. The sub routine s361 is shown in the steps after s365. In the step s365, the terminal $p_{17}$ is made High and the transistor $BT_1$ is made off and the terminal $p_{19}$ is made High in the step s366 to release the AE lock. The bits $b_{34}$ to $b_{37}$ are made "0000" to turn off the LEDs $L_2$ to $L_4$. The display data is transferred in the step s368 then the self timer flag STF is reset to 0 and the program flow goes to RETURN. The steps s359 and s361 can be omitted when the rear lid is closed. However, these steps are performed if the steps after s266 are performed when the boosting is made upon closure of the switch $S_1$.

When the light measurement switch $S_1$ is turned on upon operation of the release button 1 up to the first depth, the output of the inverter $IN_1$ is fallen to Low and the microprocessor MC operates the interruption upon receipt of the signal at the terminal $it_1$. If the interruption of the switch $S_1$ occurs during execution of other works in the microprocessor MC while the $it_1$ interruption is disabled, the work based on the closure of the switch $S_1$ is enabled after the $it_1$ interruption is enabled. When the microprocessor MC does not execute any works but the interruption is enabled, the microprocessor MC can operate directly upon closure of the switch $S_1$. In case the photographic film is not wound in the predetermined period due to consumption of the battery BA and in case the lens cover is closed, the microprocessor MC does not operate even if the light measurement switch S1 is operated.

Figure 12A:
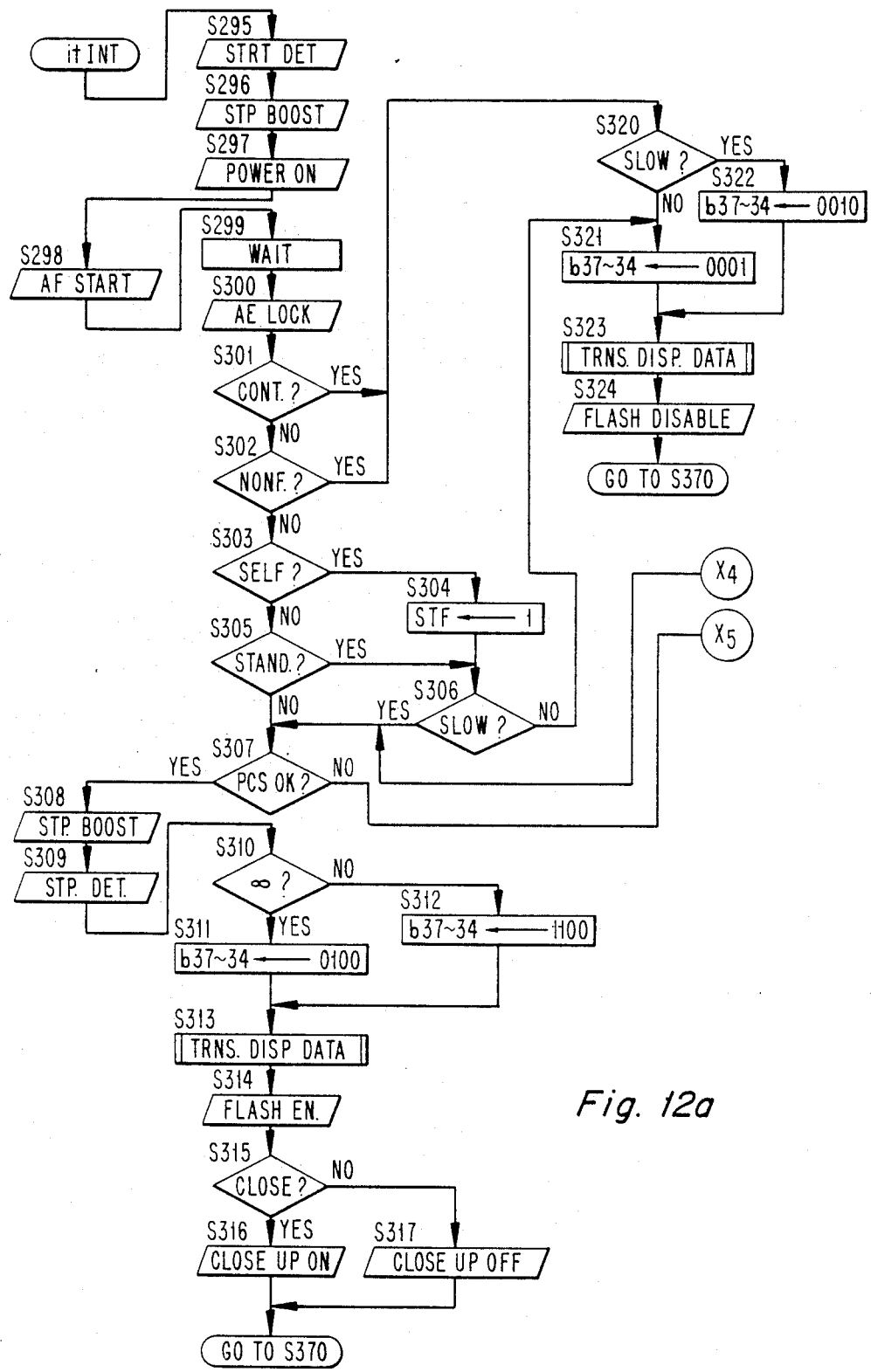
Figures 12B, 12C:
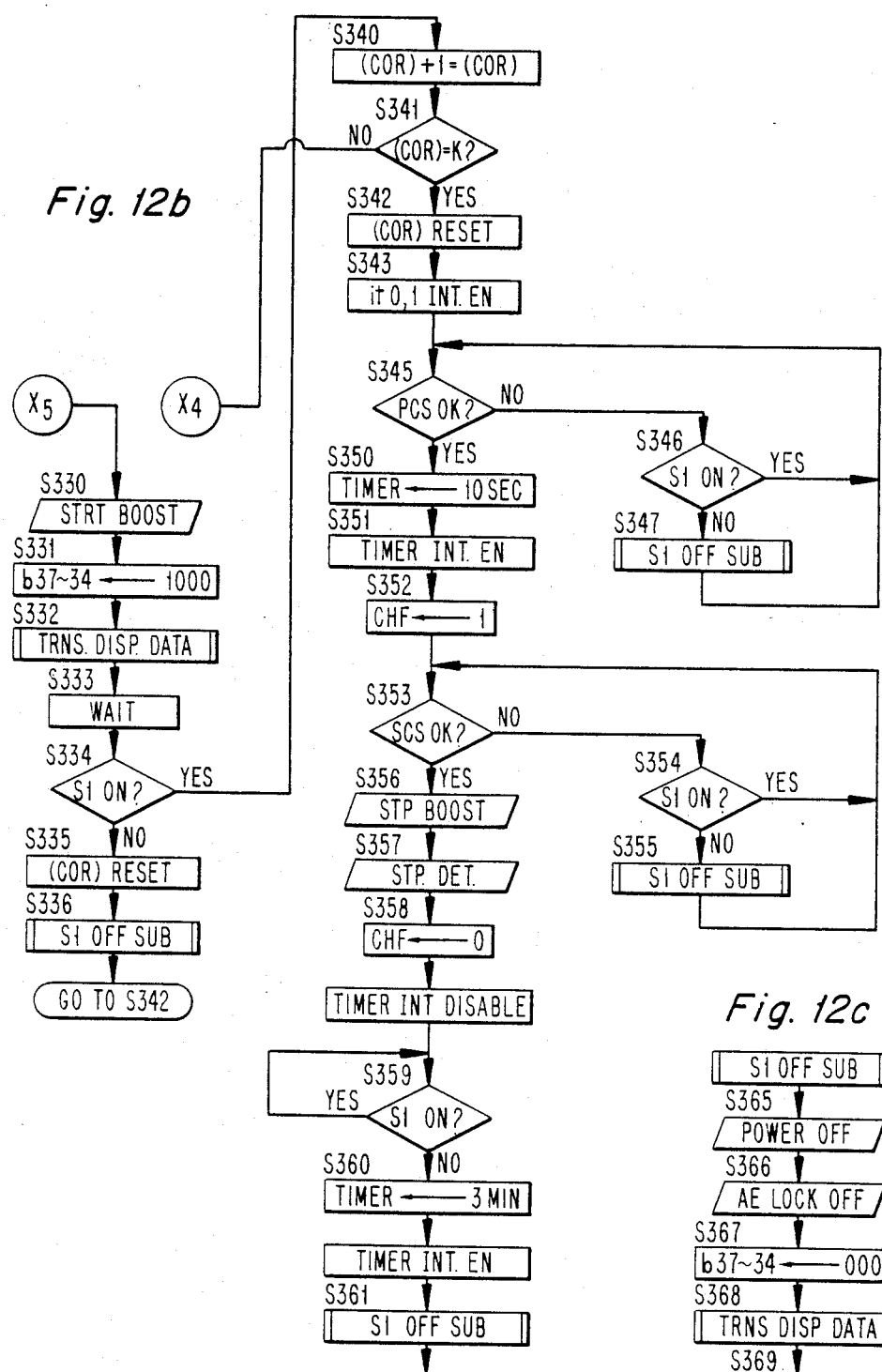

When the light measurement switch $S_1$ is turned on, the microprocessor MC starts its operation from the step s295 shown in FIG. 12. In the step s295, charge detection is started and the boosting is stopped in the step s296, then the program flow goes to the step s297. In the step s297, the terminal $p_{17}$ is made Low, causing the transistor $BT_1$ to be conducted and a High pulse is generated at the terminal $p_{26}$ in the step s298 to start distance measurement by the automatic focusing circuit AC. The step s299 waits for stabilization of the light measuring circuit, then the program flow goes to the step s300 causing the the terminal $p_{19}$ to be Low to store the result of the light measurement, making AE lock.

In the step s301, it is judged whether the camera is set in the consecutive picture taking mode and it is judged whether the camera is set in the non flash light mode. If one of the above modes is set, the program flow goes to the step s320 so as not to emit the flash light. In the step s320, it is judged whether the terminal $p_{23}$ is Low. The terminal $p_{23}$ is made Low, when the exposure time is longer than the time for preventing that the effect of the camera shake appears on the picture. In case there occurs under exposure if the shutter is controlled by the lower limit exposure time, program flow goes to the step s322 wherein the bits $b_{34}$ to $b_{37}$ are set by "0010", whereby the green LED $L_2$ is turned on and off then the program flow goes to the step s323. In case the exposure time is so short that the effect of the camera shake does not appear on the picture but a desired exposure can be obtained, the bits $b_{34}$ to $b_{37}$ are made "0001" to turn on the green LED $L_2$ then the program flow goes to the step s323 wherein the display data is transferred and the terminal $p_{21}$ is made Low to prevent the emission of the flash light and the program flow goes to the step s370.

In case it is judged in the steps s301 and s302 that the mode set in the camera is neither the consecutive picture taking mode nor the non flash light mode, it is judged in the step s303 that the self timer mode is set. If yes, the flag STF is made "1" and the program flow goes to the step s306. If the self timer mode in not set, it is judged in the step s305 whether or not the normal picture taking mode is set. With yes, the program flow goes to the step s306. With no, the program flow goes to the step s307 for performing the fill in flash mode or the close picture taking mode wherein the flash light is emitted regardless of the exposure time set by the result of the light measurement. In case the self timer mode or normal picture taking mode is set, it is judged in the step s306 whether the exposure time set in the camera is within the range of the shutter time of appearing the effect of the camera shake in the picture. If the exposure time is longer than the limit time of appearing the effect of the camera shake in the picture, the program flow goes to the steps after s307 for using the flash light and if the exposure time in shorter than the limit time of appearing the effect of the camera shake in the picture, the program flow goes to the step s321 for the normal picture taking mode.

It is judged in the step s307 whether the PCS is completed and with NO the program flow goes to the step s330 to start the boosting operation and the bits $b_{37}$ and $b_{34}$ are set by "1000" so as to turn on and off the red LED $L_3$ and the display data is transferred and after waiting a predetermined time then it is judged in the step s334 whether the light measurement switch $S_1$ is turned on. With OFF of the switch $S_1$, the register COR is reset in the step s335 then the $S_1$ off sub routine is executed and the program flow goes to the step s342. With ON of the switch $S_1$, "1" is added to the contents of the register COR in the step s340 then it is detected in the step s341 whether the contents of the register COR reaches a value K. If the contents of the register does not reach the value K, the program flow goes to the step s307 and if the PCS is not completed, the operation mentioned above is repeated. When it is detected in the step s341 that the contents of the register COR reaches the value K, i.e., the predetermined time is lapsed. By setting the predetermined time X K in 0.5 seconds, the program flow goes to the step s342 if PCS is not completed before 0.5 seconds lapses, even if the switch $S_2$ is turned on the exposure control is not executed so far as the switch $S_1$ is kept turned on and picture taking can not be made.

When it is detected in the step s307 that PCS is completed, boosting is stopped in the step s308 and the detection of the charging state of the main capacitor is stopped in the step s309. Then the program flow goes to the step s310 wherein it is judged whether the terminal $p_{24}$ which is High against the long distance that the amount of the flash light is insufficient for a desired exposure. If the amount of the flash light is insufficient, the bits $b_{37}$ to $b_{34}$ are set by "0100" so as to turn on and off the green LED $L_4$. While the amount of the flash light is sufficient, "1100" are set on the bits $b_{37}$ to $b_{34}$ so as to continuously turn on the green LED $L_4$. Then the display data is transferred in the step s313 and the terminal $p_{21}$ made high so as to emit the flash light. In turn the program flow goes to the step s315 wherein it is judged whether the close picture taking mode is set in the camera and with yes, the terminal $p_{22}$ is made High and with no, the therminal $p_{22}$ is made Low, then the program flow goes to the step s370. In case fill in flash mode is performed in the close picture taking mode, the terminal $p_{22}$, transistors $BT_7$ and $BT_8$, resistor $R_0$ and the steps s315 to 317 may be omitted.

With the contents K of the register COR, that is the predetermined period of 0.5 seconds is lapsed, the contents of the register COR is reset in the step s342 then the interruption to the terminals $it_0$ and $it_1$ is enabled in the step s342. In the step S345, it is detected whether PCS is completed and without completion of PCS, the program flow goes to the step s346 so as to judge whether the light measurement switch $S_1$ is on. If the switch $S_1$ is off, the sub routine s347 is performed, while the switch $S_1$ is on, the program flow goes to the step s345. With completion of PCS, the program flow goes to the step s350 to set 10 sec. in the timer. Then the timer interruption is enabled, causing the flag CHF to be set "1" and it is judged whether or not SCS is completed in the step s353. Without completion of SCS, the program flow goes to the step s354 to perform the same operation as in the steps s346 and 347 then returns to the step s353. With completion of SCS, the program flow goes to the step s356 to stop the boosting and detection of the charge in the capacitor $C_{11}$, thereafter the flag CHF is reset to "0". Then the program flow goes to the step s359 to wait for off condition of the light measurement switch $S_1$, with off of the switch $S_1$, 3 minutes is set in the timer and the sub routine of $S_1$ off is performed, whereby the microprocessor MC stops. In case there is no operation on the camera for 3 minutes, the mode of the camera is automatically updated to the normal picture taking mode. This period can be extended for a period during which the light measurement switch $S_1$ is turned on but picture is not taken.

Summing up the operation of the flash light picture taking, after it detected that the flash light is necessary, it is judged whether PCS is completed. With completion of PCS, the exposure control is executed. Without completion of PCS, boosting is performed, then the exposure control is executed if PCS is completed within 0.5 sec.. If PCS can not be completed within 0.5 sec., the boosting is continued until SCS is completed regardless of on and off of the light measurement switch $S_1$, but exposure control is not executed so far as the light measurement switch $S_1$ is depressed. It may be omitted to set the time of 0.5 sec.. In order to do so, the steps s333, 335, 340, 341 and 342 may be omitted and the program flow goes to the step s343 if the switch $S_1$ is on, on the other hand if the switch $S_1$ is off, the program flow goes to the step s343 through the sub routine s336.

If the preparatory operation for the normal picture taking and/or flash light picture taking is finished, the program flow goes to the step s370, wherein it is judged whether the light measurement switch $S_1$ is on. With off of the switch $S_1$, the program flow goes to the step s394 for returning to the state before the switch $S_1$ is made on. With on of the switch $S_1$, it is judged whether or not the switch S2 is on by depression of the release button 1 up to the second depth. With off of the switch S2, the program flow goes to the step s370 so as to wait that the switch S2 is made on while it is being judged that the switch S1 is made off. With on of the switch S2, program flow goes to the step s372 to judge whether the flag STF is "1" or the self timer mode is set. If the flag STF is "1", the timer is set by 10 sec. in the step s373 for the period of the self timer shutter operation, and the bits $b_{37}$ and $b_{34}$ are set by "00001", thereby causing the red LED $L_1$ to be turned on and off repeatedly and causing the other LEDs $L_2$ to $L_4$ to be turned off, transferring the display data. In the step s376 the interruption to the terminals $it_0$ and $it_1$ and timer interruption are enabled and the microprocessor MC stops. By the operation as mentioned above, only the red LED $L_1$ is turned on and off. It is noted that the timer interruption is enabled because of allowing the film rewinding, closure and opening of the rear lid, opening or closing of the lens cover, changes of the mode and depression of the release button, releasing the self timer mode.

If 10 seconds are lapsed, the microprocessor MC is enabled by the timer interruption to execute the operation shown in the step s245 in FIG. 11. With 1 of the flag STF, the program flow goes to the step s276 through the steps s245, 255, 265 and 275. In the step s276, the bit $b_{33}$ is made "0" to turn off the red LED $L_1$ of the self timer display, then the display data is transferred and the flag STF is made "0" and the exposure control is executed by the step s380.

In case the flag STF is "0" or the time of 10 sec. of the self timer is lapsed in the step s372, the program flow goes to the step s380 causing the terminal $p_{20}$ to be High to start the exposure control and lens displacement. In the step s381, the flag RLF for representing that the exposure control is being made is set to "1". Then the timer is set to 50 msec. to enable the timer interruption whereby the program flow goes to the step s384. In the step s384, the operation of the exposure control mechanism for example the lens displacing mechanism is started and waits for on of the switch LES. If 50 msec. is lapsed before the switch LES is turned on, since there is any fault condition, the timer interruption is enabled and the step s245 is performed. With the flag RLF is "1", the program flow goes to the step s281 through the steps s245, 255, 265, 275 and 280. In the step s281, the terminals $p_{17}$ and $p_{19}$ are made High, thereby causing the transistor BT1 to be off to release the AE lock. Then the terminals $p_{13}$ and $p_{22}$ are made Low so that the detection of the charge of the capacitor $C_{11}$ is stopped and the close picture taking mode is released. The flag RLF is reset to "0" and the bits $b_{37}$ to $b_{34}$ ar made "0000" to turn off the LEDs $L_2$ to $L_4$, transferring the display data. Then the interruption to the terminals $it_0$ and $it_1$ is enabled and the microprocessor MC stops.

When it is detected that the switch LES is turned on during 50 msec., the timer interruption is disabled in the step s385 and the step s386 waits for that the terminal $p_{25}$ is made High by completion of the exposure control by the automatic exposure control circuit EC. When the terminal $p_{25}$ is made high, the program flow goes to the step s388 to start the film winding. When the film winding is finished with the rear lid closed, the register FCR for the film count is added by 1 and in turn the sub routine for the film counter display is executed then the program flow goes to the step s392. When the film winding is finished with the rear lid opened, the program flow goes to the step s392, wherein it is judged whether or not the light measurement switch S1 is turned on. With on of the switch S1 the program flow goes to the step s393. Then it is judged whether or not the consecutive picture taking mode is set. If the consecutive picture taking mode is not set, the program flow goes to the step s392 to wait OFF of the light measurement switch S1. If the consecutive picture taking mode is set, the program flow goes to the step s298 shown in FIG. 12 to start the subsequent exposure control. As mentioned above, if the consecutive picture taking mode is set, so far as the switch S2 is turned on, pictures can be consecutively taken under the ambient light.

If it is detected in the step s392 that the light measurement switch S1 is turned off, the program flow goes to the step s394 to execute the sub routine for the switch S1 off, and then the program flow goes to the step s395, wherein it is judged whether or not the flag RLF is "1". With "1" of the flag RLF, that is to say that the light measurement switch $S_1$ is turned off and the exposure control is performed, the program flow goes to the step s396 to set the flag RLF "0". Subsequently the bits $b_{32}$ to $b_{30}$ are set by "001" setting the normal picture taking mode in the subsequent picture taking, then the display data is transferred and the interruption to the terminals $it_0$ and $it_1$ is enabled and the program flow goes to the step s215 in FIG. 11 to perform the boosting. If the flag RLF is "0" in the step s395, the program flow goes to the step s400, thereby causing the timer to be set by 3 minutes, then the interruption to the terminals $it_0$ and $it_1$ is enabled and the microprocessor MC stops. That is when the flag RLF is "0", i.e., when the exposure control is not performed and the light measurement switch S1 is turned off, the program prepares to set the camera mode automatically to the normal picture taking mode after 3 minutes, then the microprocessor MC stops.

In case the manual film rewind switch MRWS is turned on by a manual operation or the switch ARWS is turned on due to stretch of the photographic film when the photographic film is fully wound up to the final frame, if the light measurement switch S1 is turned off, the microprocessor MC operates from the step s1 and the program flow goes to the step s6 through the steps s2, 3, 4 and 5. In the step s6, it is detected whether the photographic film is present in the camera, and with absence of the photographic film the interruption to the terminals $it_0$ and $it_1$ is enabled and the microprocessor MC stops. If the photographic film is present, the program flow goes to the step s7 and it is judged whether or not the rear lid is closed. With the rear lid closed, the bits $b_{25}$ and $b_{24}$ are set by "10" to turn off the film winding display 33 and 34 and the display parts 31 and 32 are turned on and off alternately. Subsequently the bits $b_{32}$, $b_{31}$ and $b_{30}$ are set "001" to set the normal picture taking mode and the bits $b_{37}$ to $b_{33}$ are set by "00000" to turn off the LEDs $L_1$ to $L_4$. Then the display data is transferred and the program flow goes to the step s14. In the step s14, the state of the switch SPS is judged. The switch SPS is coupled with the follower sprocket (not shown) which is moved by film winding and the switch SPS is turned on and off in response to the rotation of the sprocket. With on of the switch SPS, the flag SPF is made "1" and with off of the switch SPS, the flag SPF is reset to "0". The flag SPF is provided for detecting change of the state of the switch SPS by combination of the switch SPS and the flag SPF. Subsequently the terminals $p_{10}$ and $p_{11}$ are made Low and High respectively so as to drive the motor MO in the reversed direction for rewinding the photographic film. Then the timer is set by ¼ second and the timer interruption is enabled. Then the flag RWF representing during the film rewinding is made "1" and the program flow goes to the step s28, wherein it is judged whether or not the rewinding switch ARWS is on. With on of the switch ARWS, the flag ARF is set to "1" and with off of the switch ARWS, the flag ARF is reset to "0".

In the step s21, it is judged whether or not the film winding switch FWS is on. With on of the switch FWS, the sub routine for the film rewinding is performed then the program flow goes to the step s1. With off of the switch FWS, the program flow goes to the step s23 so that it is judged whether or not the switch FWS is on and with off, the sub routine of s24 for the film rewinding is performed and the program flow goes to the step s23. When the switch FWS is turned on, the program flow goes to the step s25, wherein 1 is subtracted from the contents of the register FCR for the film counter and the contents of the register FCR are displayed by the sub routine s26 then the program flow goes to the step s21. The operation mentioned above is repeated until it is detected that the rear lid is opened, film rewinding is completed or there occurs an abnormal operation during rewinding of the film in the course of the rewinding sub routine.

The rewinding sub routine after the step s30 is explained hereinafter. In the step s30, it is judged whether or not the rear lid is opened. If opening of the rear lid is detected, the terminals $p_{10}$ and $p_{11}$ are made High for 50 msec. to brake the motor MO, then both of the terminals are made Low and the program flow goes to the step s93 to operate the process when the rear lid is opened. When it is judged in the step s30 that the rear lid is not opened, it is judged whether or not the switches $FDS_0$ and $FDS_1$ are both in the state that they do not detect the photographic film. If both of the switches $FDS_0$ and $FDS_1$ are not detecting the photographic film, the program flow goes to the step s46 to judge whether the flag ARF is "1". With 0 of the flag ARF, the program flow goes to the step s33 immediately so as to stop the motor MO to stop the film winding for leaving a suitable length of the end portion of the photographic film extruded from the container. If the flag ARF is "1", the photographic film is being rewound, the photographic film is continuously rewound for a suitable time by waiting a possible time in the step s47 so that the end portion of the film is fully retracted in the container then the motor is stopped in the step s33. Subsequently the bits $b_{25}$, $b_{23}$ and $b_{22}$ are set by "011" to turn off the rewinding display parts 31 and 32 in the step s34, and the display parts 36 and 37 are turned on and off alternately, then the display data is transferred. Subsequently the timer interruption is disabled and the interruption to the terminals $it_0$ and $it_1$ is enabled, making either the flag RWF representing the film rewinding "0" and the flag RBF representing the closure of the rear lid "1".

When it is detected in the step s32 that the photographic film is present in the camera, it is judged whether or not the flag SPF is "1". With "1" of the flag SPF, it is judged in the step s41 whether or not the switch SPS is turned on. If the flag SPF is "0", it is judged in the step s42 whether or not the switch SPS is turned off. If the switch SPS is OFF and the flag SPF is "1", this state shows that the switch SPS is switched from ON to OFF, then the flag SPF is reset to "0", while if the flag SPF is "0" and the switch SPS is ON, this state shows that the switch SPS is switched from OFF to ON, then the flag SPF is set to "1" and the program flow goes to the step s45. Then the timer is set by ¼ sec. and the program flow goes to RETURN. When it is detected that the switch SPS is not switched, the program flow goes to RETURN directly. By this arrangement, if the switch SPS is not switched within ¼ sec., due to the fact that the photographic film is a special film and film can not be wound up or rewound even if the film is mounted in the camera, or due to the worn out of the battery BA, the timer interruption is enabled and the program flow goes to the steps after s245 in FIG. 11. With "1" of the flag RWF, the program flow goes to the step s256 through the steps s245 and 255, wherein the motor MO is stopped, causing the bit $b_{25}$ to be "0" for turning off the display parts 31 and 32. Furthermore, the bits $b_{23}$ and $b_{22}$ are set by "11" so that the display parts 36 and 37 for the rear lid are turned on and off alternately, then the display data is transferred. Subsequently, the flag RWF representing film rewinding is reset to "0", and the flag TIF representing that the film rewinding is stopped due to the abnormal condition of the film is set to "1". Then the interruption to the terminals $it_0$ and $it_1$ is enabled, and the flag RBF representing the closure of the rear lid is set by "1", then the microprocessor MC stops.

The flag RBF is made "1" when the film rewinding is completed as mentioned above due to such a reason as described below. In case the photographic film is stretched with the rear lid opened, the switch ARWS is turned on and the interruption signal is applied to the terminal $it_0$ then the microprocessor MC starts its operation. On the other hand, when it is detected that the rear lid is opened, therefore, the film is not rewound. Under such state, if the rear lid is closed, the microprocessor MC starts to rewind the film by detecting that the switch ARWS is already turned on. The flag RBF can be set to "1" by the state of the rear lid.

When the rear lid is opened and the photographic film is stretched, the program flow goes to the step s196 from s7 so as to detect the state of the lens cover. Under this condition, the mode can not be switched even if the mode button 3 is operated.

The operation when the rear lid is opened is explained hereinafter.

Figure 10A:
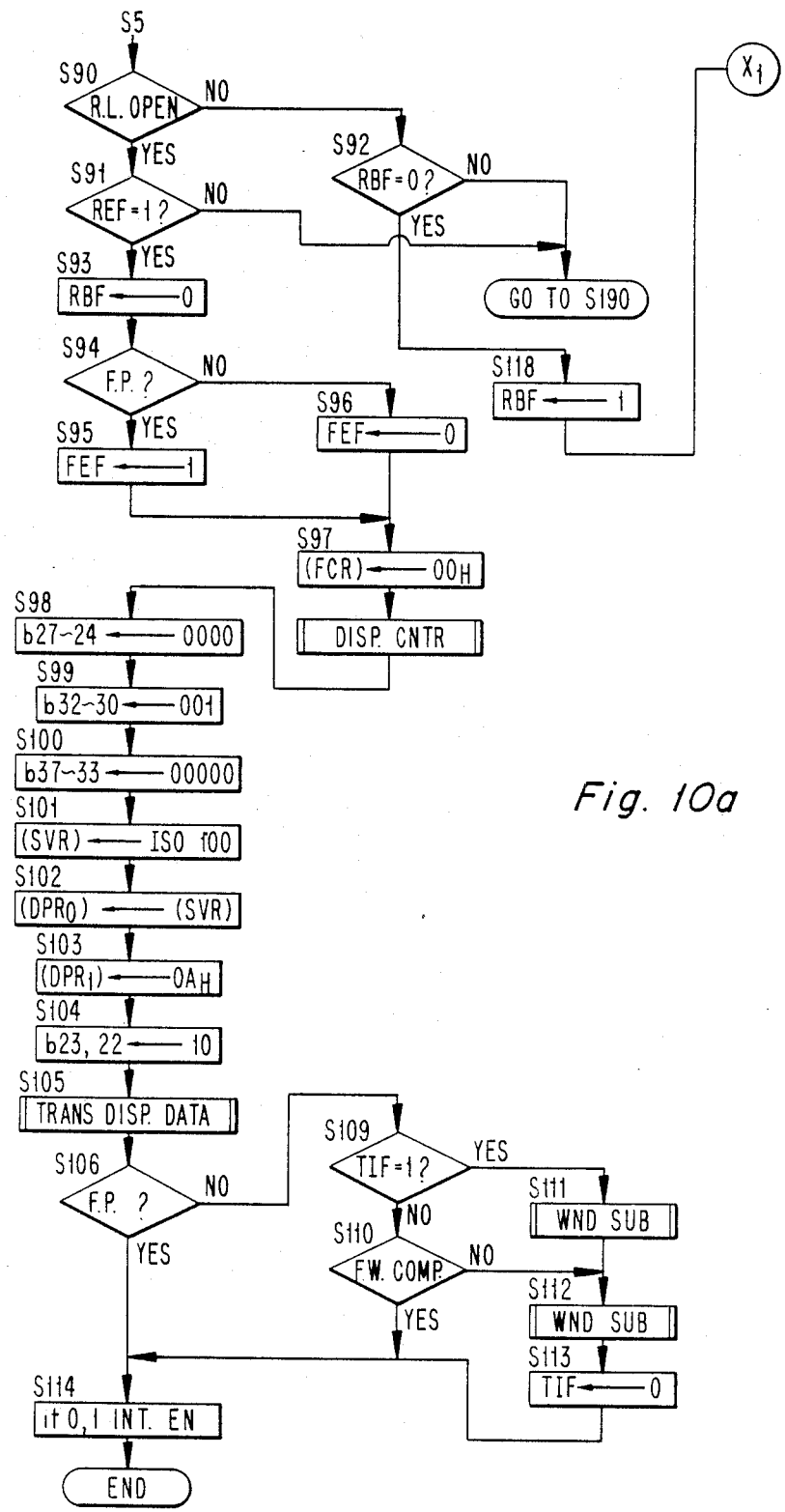
Figure 10B:
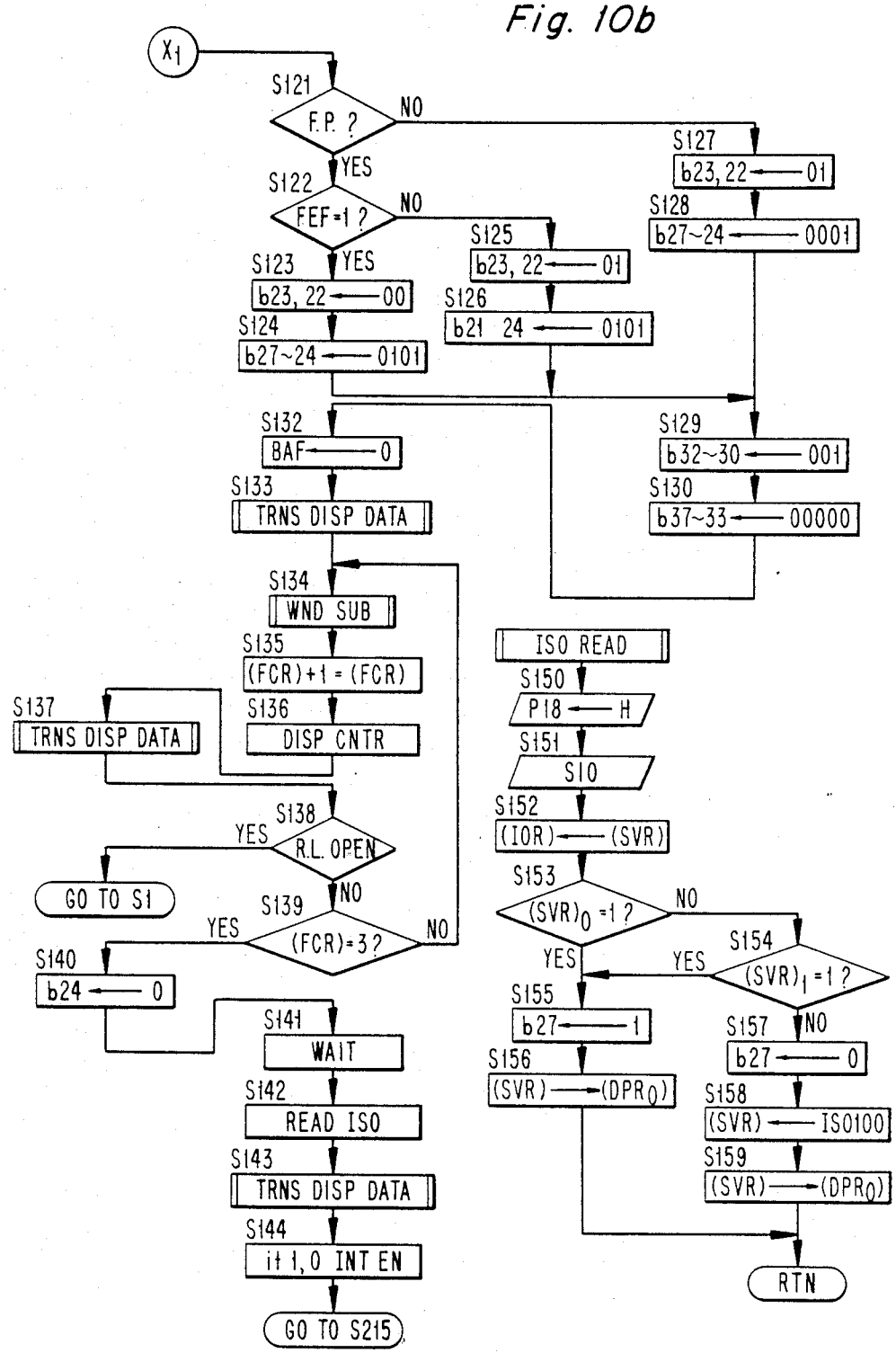
Figure 10C:
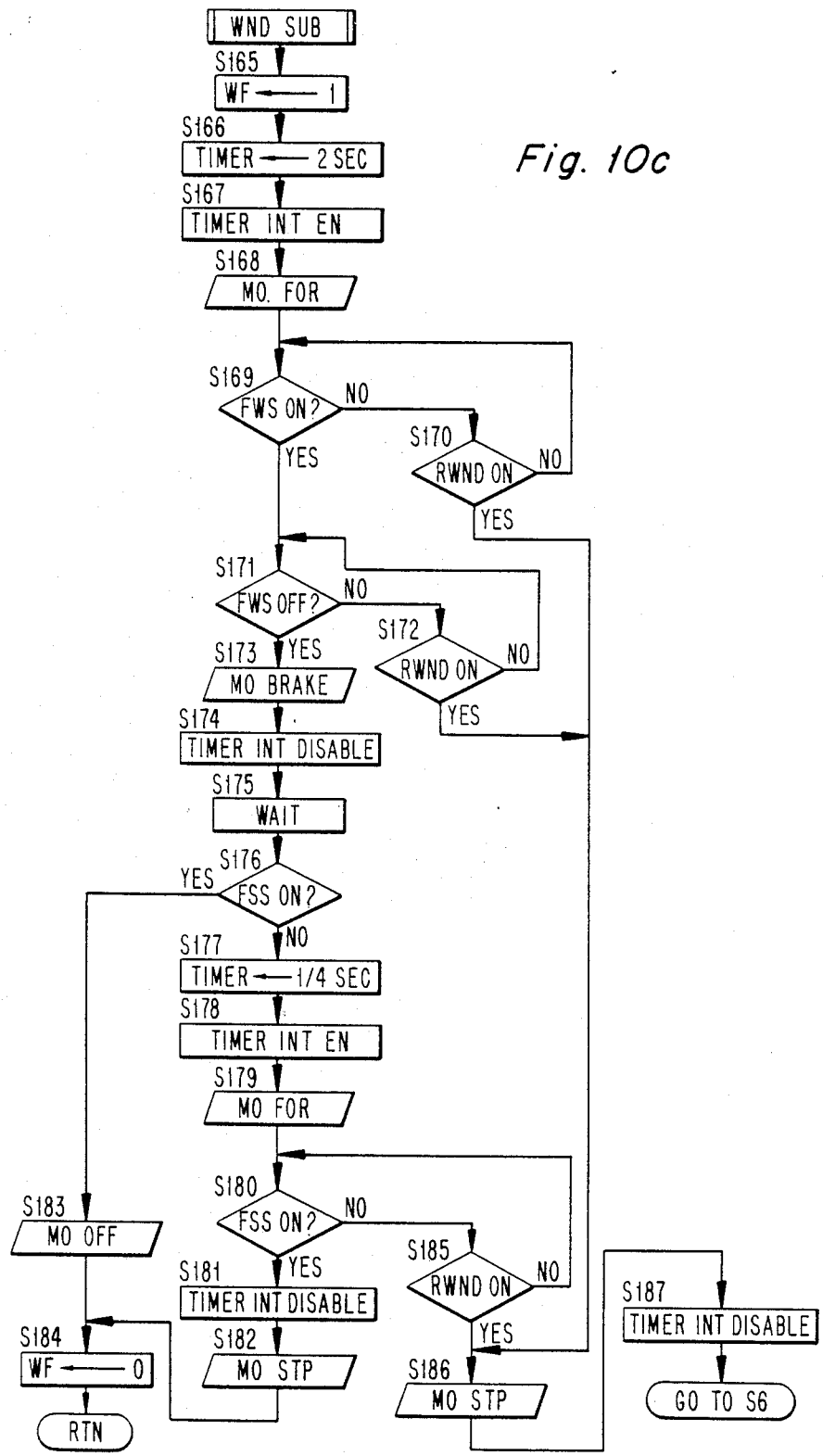
Figure 11A:
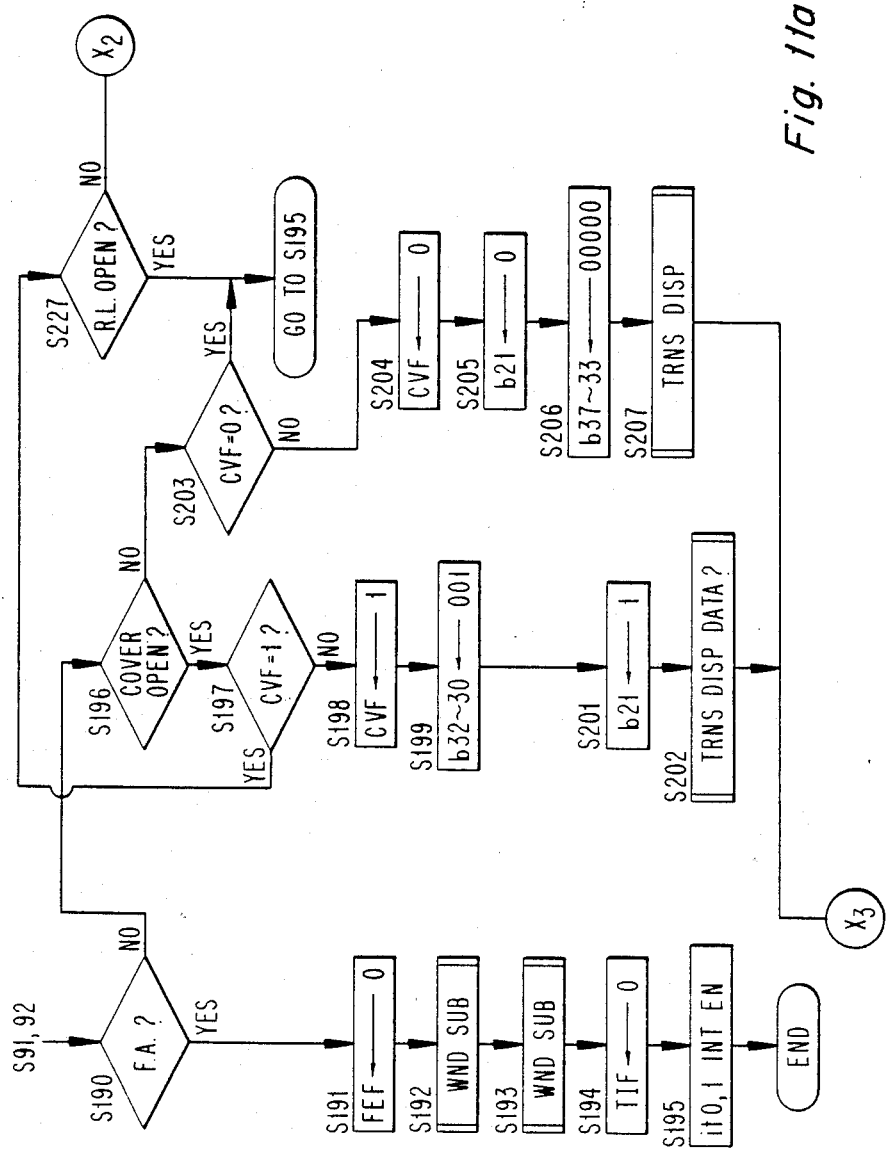
Figure 11B:
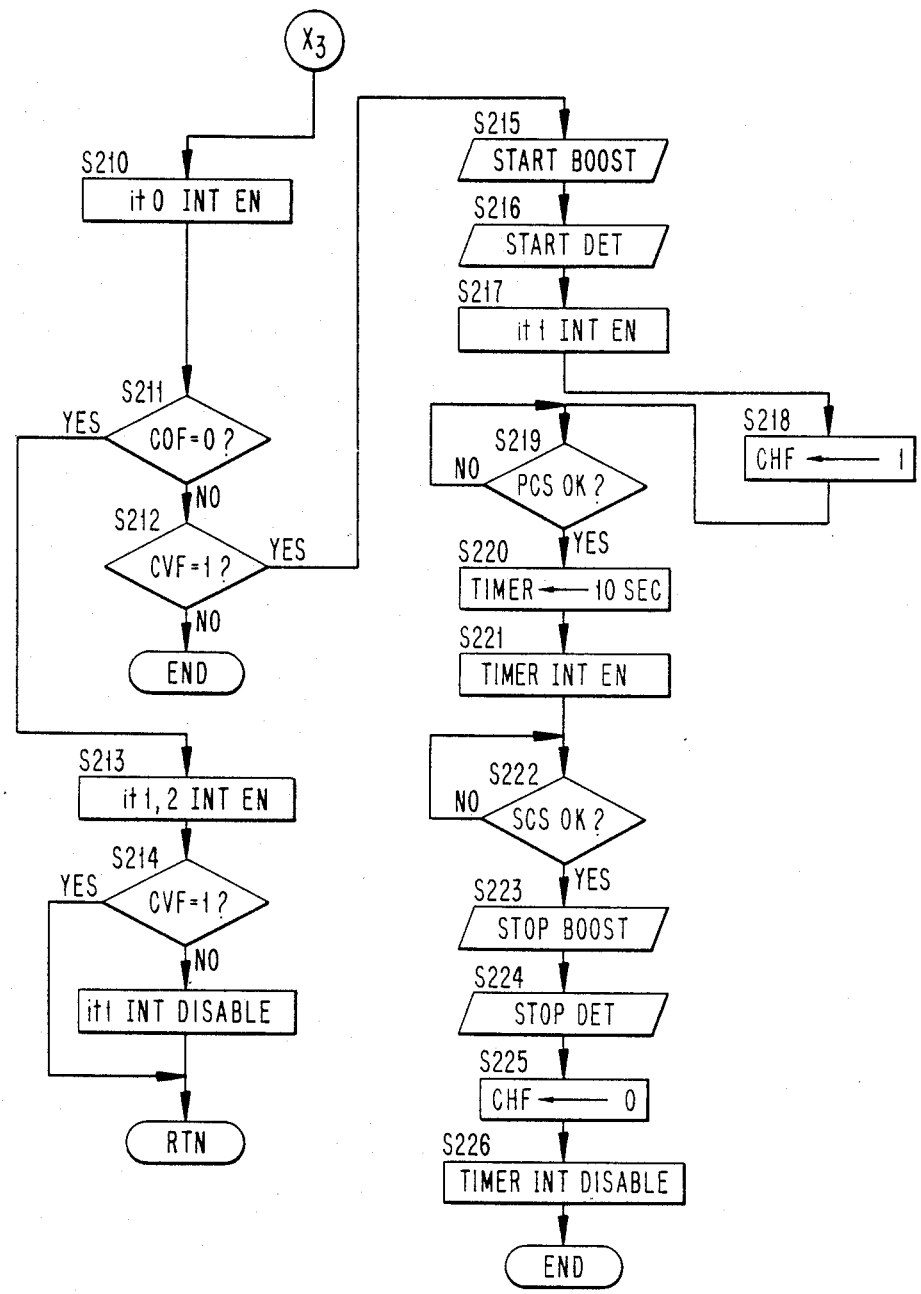
Figure 11C:
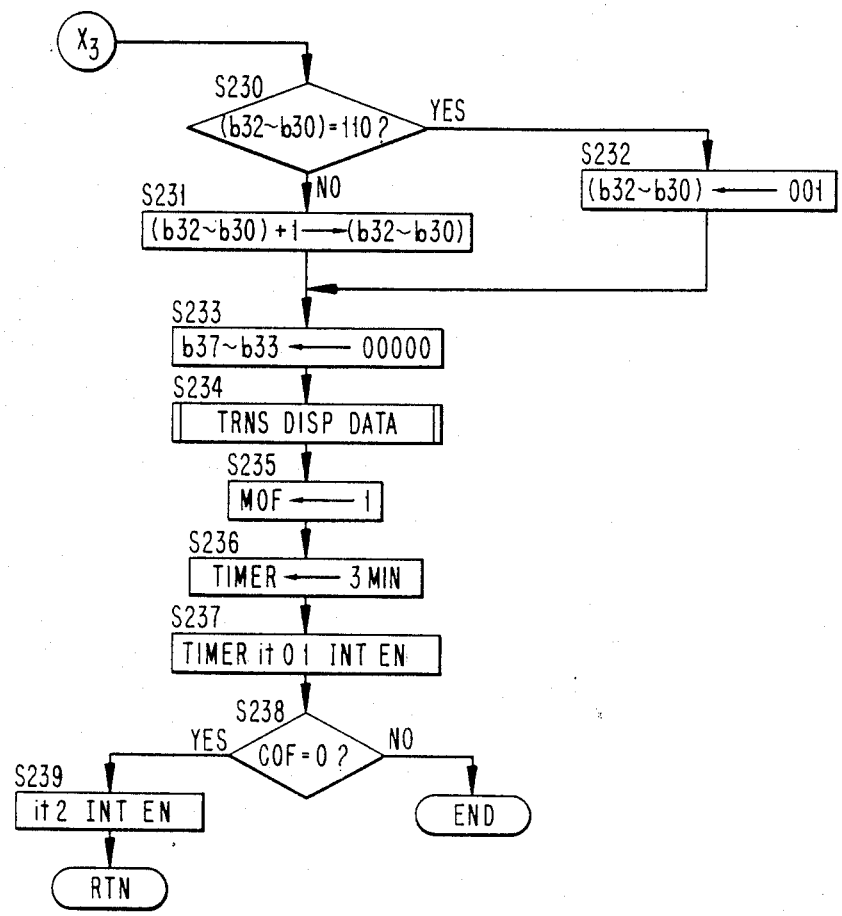
Figure 11D:
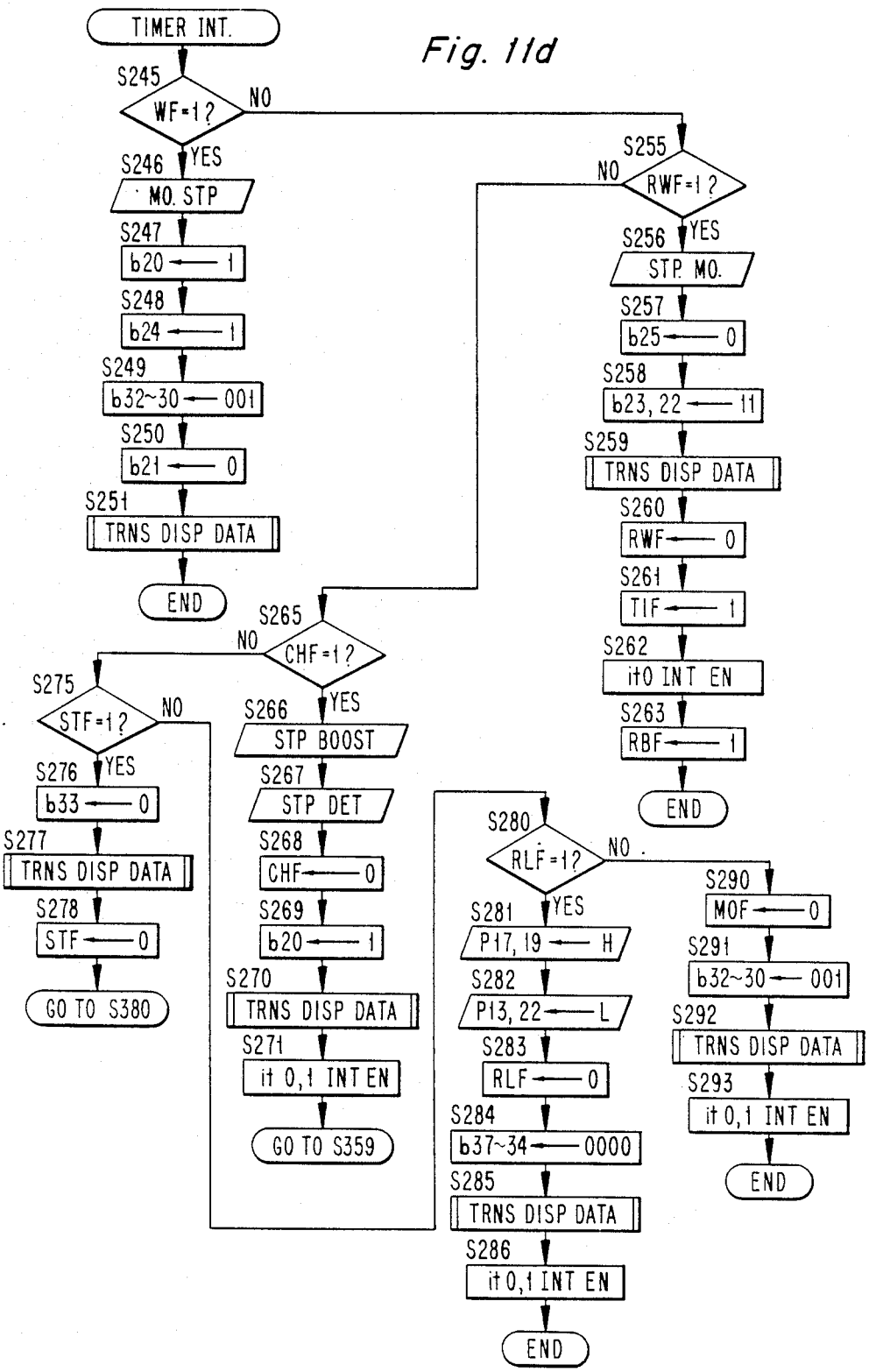

When the rear lid is opened, the switch BKS is turned on and the interruption to the terminal $it_0$ is executed and the operation from the step s90 shown in FIG. 10 through the steps s1 to s5 is performed. IF the rear lid is opened during rewinding of the photographic film, the program flow goes to the step s93 through the steps s30 and s31. If it is detected in the step s90 that the rear lid is opened and "1" of the flag RBF is detected in the step s91, the flag RBF is reset by "0" in the step s93 then the program flow goes to the step s94, wherein it is judged whether the photographic film is mounted in the camera. With the photographic film mounted, the flag FEF is set to "1" and with the photographic film not mounted, the flag FEF is reset to "0". The flag FEF is provided for causing the film display part 35 to be turned on and off in case the rear lid is opened with the photographic film mounted in the camera and then the rear lid is closed again.

The register FCR for the film counter is set by "$OO_H$" in the step s97 and the sub routine for the film count is executed then the bits $b_{27}$ to $b_{24}$ are set by "0000", causing the display part 28 to be turned on, the display parts 31 to 35 to be turned off in the step s98. Then the bits $b_{32}$ to $b_{30}$ are set by "001"'' in the step s99 to set the camera in the normal picture taking mode and the bits $b_{37}$ to $b_{33}$ are set by "00000" to turn off LEDs $L_1$ to $L_4$. The register SVR is set by the data corresponding to ISO sensitivity data of ISO 100 in the step s101, which data is transferred to the display register $DPR_0$ in the step s101. Subsequently the register $DPR_1$ is set by "$OA_H$" corresponding to the frame number of the photographic film "0" and the bits $b_{23}$ and $b_{22}$ are set by "10" to turn on the display part 37 in the step s104, then the display data is transferred. In turn the program flow goes to the step s106 wherein it is judged whether or not the photographic film is mounted in the camera. If the photographic film is present, the interruption to the terminals $it_0$ and $it_1$ is enabled and the microprocessor MC stops. If the photographic film is absent, the program flow goes to the step s109 to judge whether the flag TIF is "1". With "1" of the flag TIF, which represents that the motor MO is stopped due to the abnormal state during film rewinding, the sub routine s111 for the film winding is executed and if the photographic film is correctly wound, the sub routine s111 is repeated again. When the correct film winding is performed two times, the flag TIF is reset to "0" then the program flow goes to the step s114. This operation is provided for detecting whether the film rewinding is stopped due to the worn out of the battery BA. In case the rear lid is opened during the film rewinding, the state stored in the microprocessor MC is brought into the film rewinding completed state directly, whereby the battery BA can not be checked, so that the subroutine s111 is repeated two times. The routine s111 may be repeated more than two times. The more the number of times of repeating the routine s111, the higher the safety by checking of the battery BA. If it is detected in the step s109 that the flag TIF is "0", it is judged in the step s110 whether the film winding is completed, and if the film winding is not completed, the remainder of the film is wound in the step s112 and if it is completed, the program flow goes to the step s114.

In case the photographic film is mounted in the camera and when the rear lid is opened and the photographic film is removed from the camera, the AND gate $AN_1$ allows to pass the pulse from the one shot multivibrator circuit $OS_3$ and the interruption is applied to the terminal $it_0$ and the operation can be started from the step s1. Then the program flow goes to the step s191 shown in FIG. 11 through the steps s1 to 5, 90, 91 and 190. In the steps s191, the flag FEF which is already set to "1" in the step s95) is reset to "0" and the motor MO is started to perform the operation of the film winding to check the state of the battery BA in the steps s192 and s193. If the film winding is correctly made two times, the flag TIF is set to "0" and the interruption to the terminals $it_0$ and $it_1$ is enabled in the steps s195 and the microprocessor MC stops.

In case the lens cover is opened or closed, a pulse is generated from the exclusive OR circuit $EO_1$ and the interruption to the terminal $it_0$ is enabled and the operation is started from the step s1 and goes to the step s196 through the steps s1 to 5, 90, 91 or 92 and s190. It is judged in the step s196 whether the lens cover is opened. If the lens cover is opened, it is judged in the step s197 whether the flag CVF is "1". "1" of the flag CVF means that the state of the lens cover is kept unchanged, then the program flow goes to the step s227, wherein it is judged whether the rear lid is opened. If the rear lid is opened, the interruption to the terminals $it_0$ and $it_1$ is enabled and the microprocessor MC stops.

If the flag CVF is "0" in the step s197, it means that the lens cover is removed, then the program flow goes to the step s198 to set the flag CVF to "1". The bits $b_{32}$, $b_{31}$ and $3_{20}$ are set by "001" so as to set the camera in the normal picture taking mode, causing the bit $b_{21}$ to be "1" to turn on the display parts 16 to 27 and turn on the camera name 15. Then the display data is transferred and the program flow goes to the step s210.

If it is detected in the step s196 that the lens cover is closed, it is judged in the step s203 whether the flag CVF is "0". With "0" of the flag CVF, which represents that the lens cover is kept closed. Under this state, the interruption is enabled by the operation of the mode switch MOS. However, since the mode can not be changed if the lens cover is closed, the interruption to the terminals $it_0$ and $it_1$ is enabled and the microprocessor MC stops.

When it is detected that the lens cover is closed from the opened state, the flag CVF is set to "0" in the step s204. Then the bit $b_{21}$ is set to "0" to turn off the display parts 15, 16 to 27 and the bits $b_{37}$ to $b_{33}$ are made "00000" to turn off LEDs $L_1$ to $L_4$ further the display data is transferred and the microprocessor MC stops. Interruption to the terminal $it_0$ is enabled in the step s210 and the state of the flag COF is judged in the step s211. The flag COF is set to "0" while the preset in the film counter is possible. When the flag COF is "1" with the lens cover closed, the microprocessor MC stops and the interruption only to the terminal $it_0$ is enabled and the interruption by the light measurement switch S1 is disabled. When it is detected that the flag CVF is "1" with the lens cover opened in the step s212, the operation after the steps s215 to start the boosting in the flash circuit is executed and the interruption to the terminal $it_1$ is enabled. If the flag COF is "1" with the lens cover opened, the interruption to the terminals $it_1$ and $it_2$ is enabled. If the lens cover is closed, only the interruption to the terminal $it_2$ is enabled. The interruption to the terminal $it_0$ is enabled by the step s210.

When the mode switch MOS is turned on, if the lens cover is opened with the rear lid closed, the operation is started after the step s230 by the interruption to the terminal $it_0$. In the step s230, it is judged whether the bits $b_{32}$, $b_{31}$ and $b_{30}$ are "110". With "110", the data "001" is set in the step s232 to set the normal picture taking mode. If the bits $b_{32}$, $b_{31}$ and $b_{30}$ are not "110", 1 is added to the data then the operation mode is changed. Then the bits $b_{37}$ to $b_{33}$ are set by "00000" and the display data is transferred. Subsequently the flag MOF is set to "1" for 3 minutes in the step s235, setting the timer with 3 minutes in the step s236 and the interruption to the terminals $it_0$ and $it_1$ is enabled in the step s237. In the step s238, it is judged whether or not the flag COF is "1". With "1" the microprocessor MC stops. With "0", the program flow goes to RETURN.

The timer interruption is executed after 3 minutes unless any interruption to the terminal $it_0$ until 3 minutes lapsed during change over by the operation of the mode switch MOS is inputted or ON and OFF of the light measurement switch S1 after change over of the mode is made. In this case, the operation is started from the step s290 in FIG. 11, the flag MOF is reset to "0" with the bits $b_{32}$ to $b_{30}$ set by "001" to set the normal picture taking mode. The display data is transferred and the interruption to the terminal $it_0$ and $it_1$ is enabled in the step s293. By the operation as mentioned above, the camera mode is automatically set by the normal picture taking mode in case of completion of the exposure control, when 3 minutes lapses after operation of the mode switch MOS and the light measurement switch S1 and-/or opening and closing of the rear lid and the film rewinding.

Figure 13A:
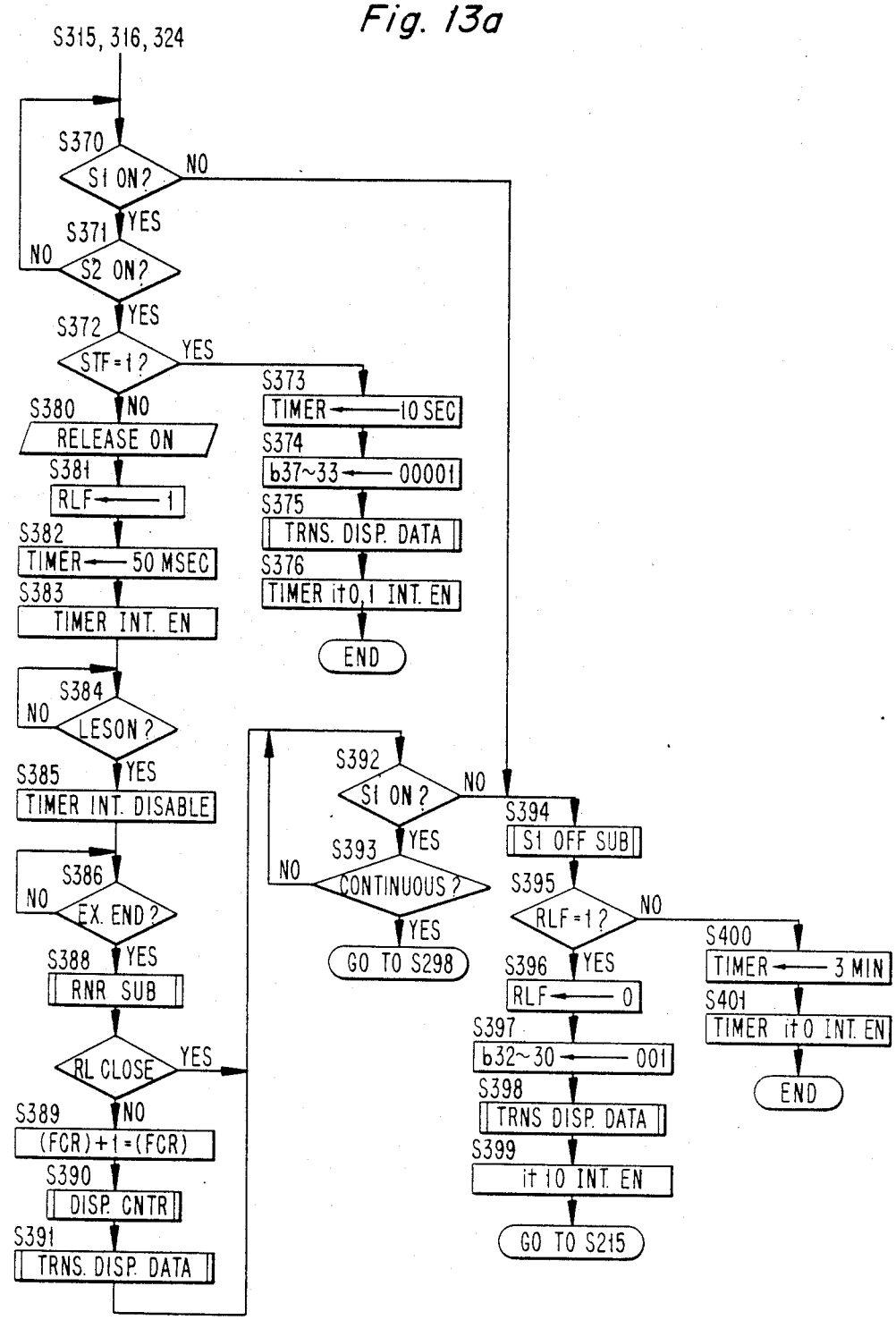
Figure 13B:
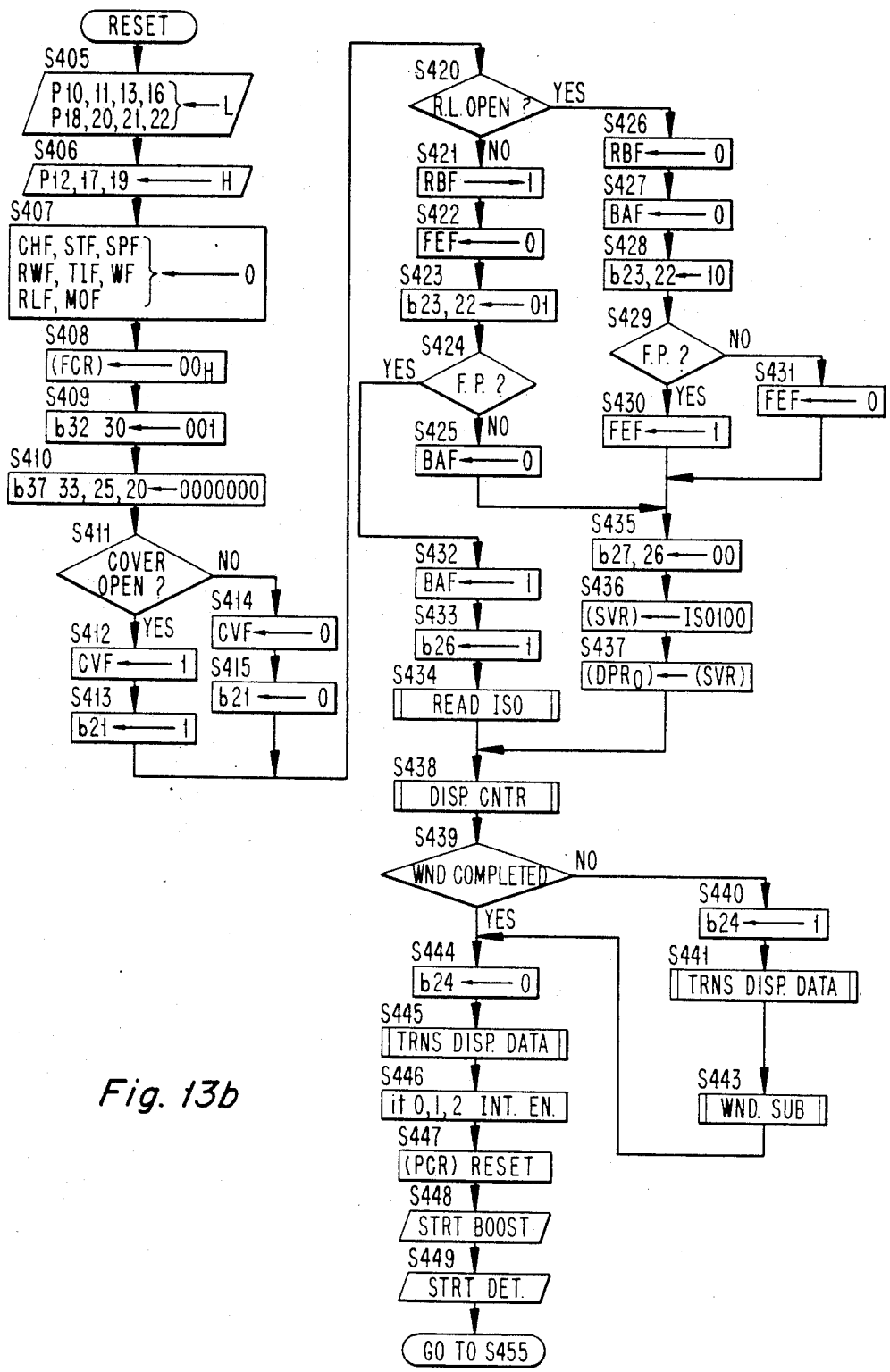
Figure 14A:
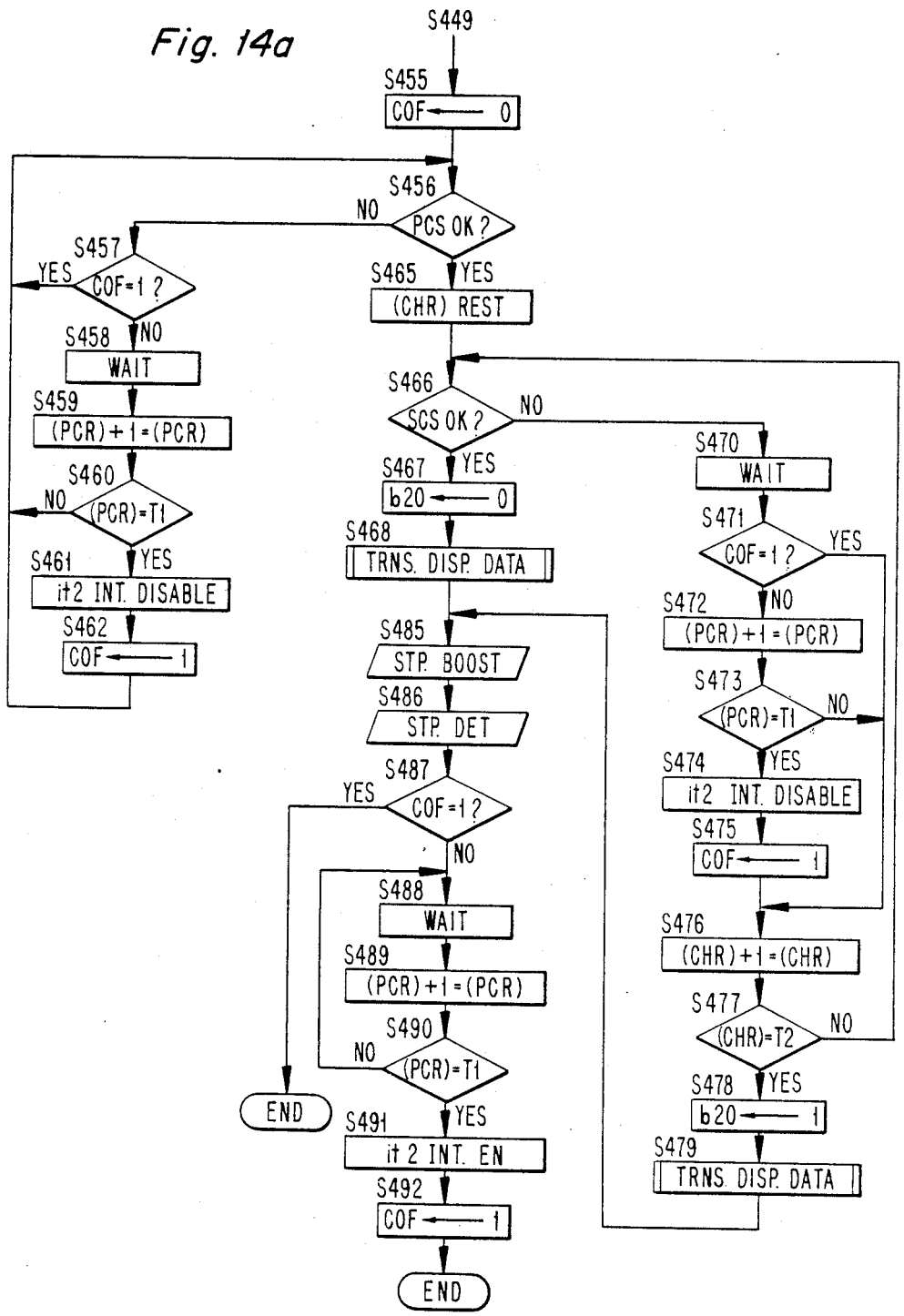
Figure 14B:
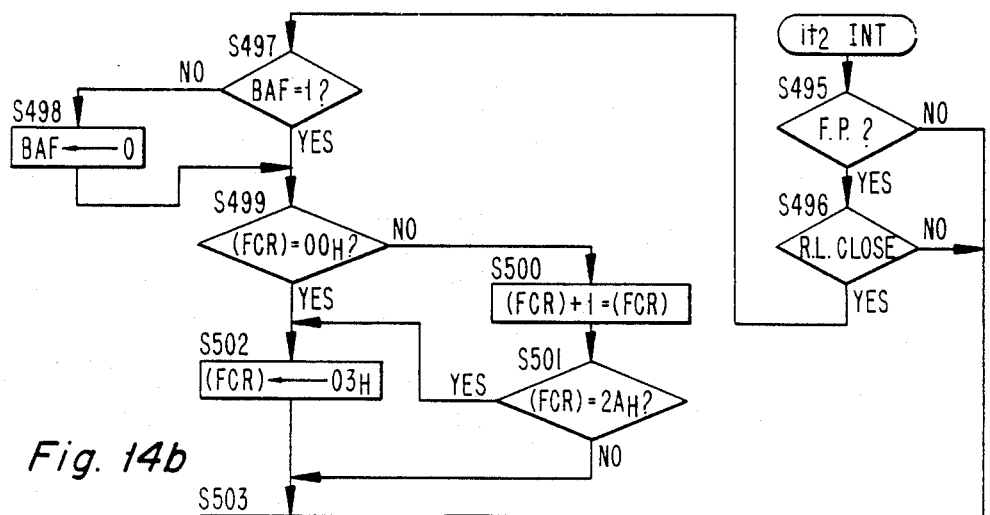

When the battery BA is replaced without the back up by the capacitor C1, a reset signal is applied to the microprocessor MC through the terminal RES, causing the microprocessor MC operate the steps after s405 shown in FIG. 13. In the steps s405 and 406, the output terminals of the microprocessor MC are initialized and the flags are initialized in the step s407. Then the register FCR for the film counter is set by "$00_H$" to set the normal picture taking mode. The bits $b_{37}$ to $b_{33}$ are set by "00000" to turn off LEDs $L_1$ to $L_4$, the bit $b_{25}$ "0" to turn off the display parts 31 and 32 and the bit $b_{20}$ "0" to turn on the display part 38 for the film counter in the step s410. It is judged in the step s411 whether or not the lens cover is opened. If the lens cover is opened, the flag CVF is set to "1" in the step s412 and the bit $b_{21}$ is set to "1" in the step s413 to turn on the display parts 16 to 27 and the camera name display 15. When the lens cover is closed, the flag CVF is reset to "0" in the step s414 and the bit $b_{21}$ is set by "0" to turn off the display parts 15 to 27 mentioned above.

In the step s420, it is judged whether or not the rear lid is opened, with NO, the flag RBF is set to "1" in the step s421 and the flag FEF is reset to "0" in the step s422. Then the bits $b_{23}$ and $b_{22}$ are set by "01" to turn on the display part 36 in the step s423. Subsequently it is detected in the step s424 whether or not the photographic film is mounted in the camera. When the photographic film is present, the flag BAF is set to "1" to turn on and off the counter display 38 and the bit $b_{26}$ is set to "1" to turn on the display part 35 in the step s433 and the ISO data on the film container is read in the step s434 and the program flow goes to the step s438. If the photographic film is not mounted in the camera, the flag BAF is reset to "0" in the step s425 and the bits $b_{27}$ and $b_{26}$ are set by "00" to turn on the display part 28 for the ISO sensitivity data and the display part 35 is turned off in the step s435. Then the register $DPR_0$ is set by ISO 100 and the program flow goes to the step s438.

When it is detected in the step s420 that the rear lid is opened, the program flow goes to the step s426 to reset the flag RBF by "0". Then the flag BAF is reset to "0", and the bits $b_{23}$ and $b_{22}$ to "10" in the step s423 to turn on the display part 37. Subsequently it is judged whether the photographic film is mounted in the camera. If the photographic film is present, the flag FEF is set to "1" in the step s430. If the photographic film is not present, the flag FEF is reset to "0" and the program flow goes to the step s435.

In the step s438, the sub routine for the film counter display and it is judged in the step s439 that the film winding is completed. If the film winding is not completed, the bit $b_{24}$ is set to "1" to turn the display parts 33 and 34 on and off alternately, then the display data is transferred, performing the sub routine s443 for the film winding, and the program flow goes to the step s444. If it is detected in the step s439 that the film winding is completed, the program flow goes to the step s444 to set the bit $b_{24}$ to "0" to turn off the display parts 33 and 34. Then the display data is transferred and the interruption to the terminals $it_0$, $it_1$ and $it_2$ is enabled, the register PCR is reset, and the boosting operation and detection of the voltage of the capacitor $C_{11}$ are started. Then program flow goes to the step s455, wherein the flag COF is reset to "0". The flag COF is made "0" while the film counter can be preset. The PCS is detected in the step s456, and if PCS is not completed, the program flow goes to the step s457, wherein it is judged whether or not the flag COF is "1". With "0" of the flag COF, the program flow goes to the step s458 to wait for a predetermined time, then "1" is added to the contents of the register PCR and it is judged in the step s472 whether or not the contents of the register PCR is T1. If the contents of the register PCR are not T1, the program flow goes to the step s456 directly, while if the contents of the register PCR are T1, the interruption to the terminal $it_2$ is disabled in the step s474 and the flag COF is set to "1", then the program flow goes to the step s456. By selecting the amount (the predetermined time in the step s458)×(T1)=30 seconds, it is possible to provide a 30 second timer. If PCS is completed in the course of the process as mentioned above, the program flow goes to the step s465 to reset the register CHR and it is judged in the step s466 whether or not SCS is completed. If SCS is not completed, the program flow goes to the step s470 to wait for the predetermined time, then it is judged in the step s471 whether or not the flag COF is "1". With "1" of the flag COF, the program flow goes to the step s476. With "0" of the flag COF, "1" is added to the contents of the register PCR in the step s472, subsequently it is judged whether the contents of the register PCR is T1. If the contents of the register PCR is T1, the interruption to the terminal $it_2$ is disabled in the step s491 and the flag COF is set to "1" then the program flow goes to the step s476. If the contents of the register PCR is not T1, the program flow goes to the step s476 directly. In the step s476, "1" is added to the register CHR and it is judged in the step s477 whether the contents of the register CHR is T2. With T2 of the register CHR, which represents that (the predetermined time in the step s470)×(T2)=10 seconds are lapsed, the bit $b_{20}$ is set to "1" to turn on and off the counter display part 38 then the display data is transferred and the program flow goes to the step s485. If the contents of the register CHR is not T2, the program flow goes to the step s466.

In case SCS is not completed in the step s466, the bit $b_{20}$ is set to "0" to turn on the counter display part 38, then the display data is transferred and the program flow goes to the step s485 to stop the boosting and detection of the voltage of the capacitor $C_{11}$ then the program flow goes to the step s487. In the step s487, it is judged whether or not the flag COF is "1". With "1" of the flag COF, the program flow goes to the step s488 to wait the predetermined time. When 30 seconds are lapsed, the interruption to the terminal $it_2$ is disabled, the flag COF is set to "1" and the microprocessor MC stops. If it is detected in the step s487 that the flag COF is "1", the microprocessor MC stops directly.

In case the film counter setting button 4 is depressed during the period when the interruption to the terminal $it_2$ is enabled, the switch COS is turned on and the interruption signal is applied to the terminal $it_2$, then the operation is started by the steps after s495. If the photographic film is not mounted in the camera or the rear lid is opened, the microprocessor MC stops directly. If the photographic film is mounted in the camera and the rear lid is closed, the program flow goes to the step s497 and when the flag BAF is "1", the flag BAF is made "0" and the program flow goes to the step s499. It is judged in the step s499 whether or not the contents of the register FCR are "$00_H$". With "$00_H$", "$03_H$" representing the decimal number "1" is set in the register FCR and if the contents of the register FCR is not "$00_H$", 1 is added to the contents of the register FCR. If the contents of the register FCR exceeds the upper limit value "$2A_H$" for display, "$03_H$" is set in the register FCR to display 1 then the program flow goes to the step s503. If the contents of the register FCR does not reach "$2A_H$", the program flow goes to the step s503 directly, wherein the sub routine for the film counter is executed and the display data is tranferred and the register PCR is reset to extend the time for allowing the interruption to the terminal $it_2$.

Although in the embodiment described above, in case the rear lid is closed with the photographic film mounted and the battery is replaced without the film counter kept not preset, the warning is continued until once the rear lid is opened and closed, in place of the embodiment, "1" may be displayed in the film counter display part 38 when the film winding is completed by setting "02$_H$" in the register FCR before the sub routine for the film winding is started with the flag BAF to be "1" then flag BAF is reset to "0" so that the warning is prevented. Also if the light measurement switch S1 is turned on and the flag BAF is "1", it may be set "03$_H$" in the register FCR with the flag BAF to be "0".

In the operation mentioned above, since there occurs such a case that the rear lid is opened without closure of the light measurement switch S1, if the flag BAF is "1" while the rear lid is opened, it is necessary to reset the flag BAF to "0".

Also it may be allowed to preset the film counter until the photographic film is wound first, and the time limit is released.

Figure 15:
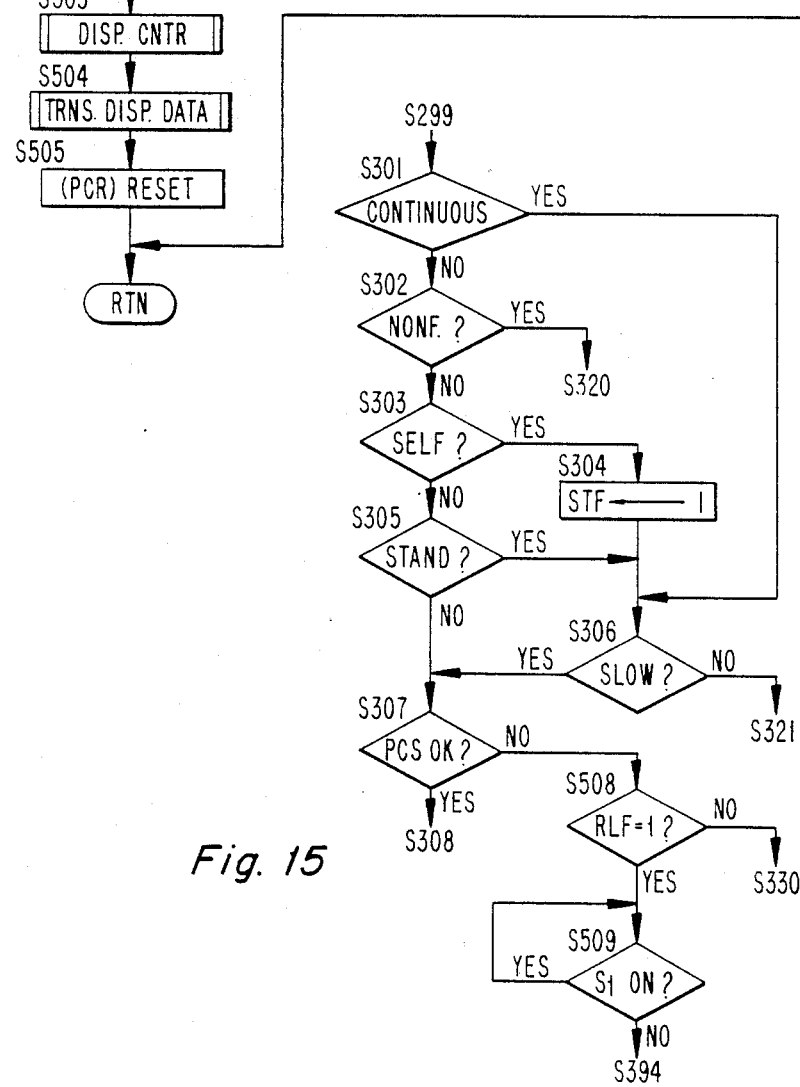

FIG. 15 shows another embodiment of the present invention in which if the flash light is necessary while the consecutive picture taking, the flash light can be emitted. In the step s301, even if it is detected that the consecutive picture taking mode is set, it is determined in the step s306 whether or not the flash light is necessary and if necessary, it is judged in the step s307 whether or not the PCS is completed. If PCS is completed, the program flow goes to the step s308 for executing the exposure control. If PCS is not completed, it is judged whether or not the flag RLF is "1". If the flag is not "1", the program flow goes to the step s330 to start the boosting operation and waits for 0.5 seconds. If the flag RLF is "1", the picture has been taken at least one time under the consecutive picture taking mode, the release operation is locked and operation of the step s509 is kept until the light measurement switch S1 is turned off then the program flow goes to the step s394. In this modification, in the consecutive picture taking mode the consecutive picture taking can be performed under the ambient light. In case of the flash light picture taking mode, if PCS is completed, picture taking is possible, and if PCS is not completed, consecutive picture taking is impossible but picture taking with the flash light can be performed only one time.

When then battery BA is exchanged after the rear lid is closed with the photographic film mounted in the camera, the waring is made with the film counter display 30 displayed by "00", the display may be "1" by setting "03$_H$" in the register FCR. If the counter is not preset, the number displayed in the display part 38 may be increased by 1 every time the photographic film is wound by one frame.

In the embodiment mentioned above, although the preset of the film counter is inhibited when the light measurement switch S1 is once turned on and off, it may be modified in such a manner that the preset of the film counter can be made for 30 second after the light measurement switch S1 is once turned off by adding the steps of resetting the register PCR when the flag COF is "1" then returns to RETURN after the steps s335, s347, s355, s361 and s401.

When the battery is exhanged with the rear lid closed and the photographic film mounted, the numeric characters "00" of the display part 38 may be turned on and off repeatedly by setting "03$_H$" in the register FCR. In this modification the interruption to the terminal it$_1$ is disabled for a predetermined time. When the preset of the film counter is completed, the interruption to the terminal it$_1$ may be enabled.

The kind of the modes settable in the camera is not limited to the example as shown in the embodiment, for example, the modes settable in the camera may be only the self timer mode and the consecutive picture taking mode or other suitable modes may be added to the modes shown in the above embodiment.

Furthermore, it may be possible to display the mode set in the camera even if the lens cover is closed. In this case the mode set in the camera may be the normal picture taking mode and it may be inhibiting to change mode and to enter the signal of the light measurement switch S1 to the microprocessor MC so far as the lens cover is closed.

TABLE 1

| REGISTER | BIT | DATA | STATE | CONTENT |
|---|---|---|---|---|
| DPR$_0$ | b$_{00}$ to b$_{04}$ | 00010~ | ISO 25 | ISO DATA |
|  |  | 11111 | ISO 5000 |  |
|  | b$_{05}$ to b$_{07}$ | ***** |  |  |
| DPR$_1$ | b$_{10}$ to b$_{13}$ | 0000 | blank | lower digit of film counter |
|  |  | 0001~ | 1~ |  |
|  |  | 1001 | 9 |  |
|  |  | 1010 | 0 |  |
|  |  | 1011 | — |  |
|  | b$_{14}$ to b$_{17}$ | 0000 | blank | upper digits of film counter |
|  |  | 0001~ | 1~ |  |
|  |  | 1001 | 9 |  |
|  |  | 1010 | 0 |  |
|  |  | 1011 | — |  |
| DPR$_2$ | b$_{20}$ | 0 | cntr on | battery good |
|  | b$_{20}$ | 1 | cntr on/off | battery consumed change battery |
|  | b$_{21}$ | 0 | mode, name off | cover closed |
|  | b$_{21}$ | 1 | mode, name on | cover opened |
|  | b$_{23}$, b$_{22}$ | 11 |  | rwnd completed |
|  |  | 01 |  | r.l. closed |
|  |  | 10 |  | r.l. opened |
|  |  | 00 |  | note 1 |
|  | b$_{24}$ | 1 |  | film winding |
|  | b$_{24}$ | 0 | off | not winding |
|  | b$_{25}$ | 1 |  | film rewinding |
|  | b$_{25}$ | 0 | off | not rewinding |
|  | b$_{26}$ | 1 | on | film present |
|  | b$_{26}$ | 0 | off | film absent |
|  | b$_{27}$ | 1 |  | ISO of container |
|  | b$_{27}$ | 0 | FIX | fixed ISO 100 |
| DPR$_3$ | b$_{32}$ to b$_{30}$ | 001 | STANDARD | normal mode |
|  |  | 010 | SELF | self timer mode |
|  |  | 011 | CLOSE | close mode |
|  |  | 100 | FILL F. | fill in flash |
|  |  | 101 | CONTI. | consecutive mode |
|  |  | 110 | NON F. | non flash mode |
|  | b$_{33}$ | 1 | L$_1$ on.off 10s | self timer on |
|  |  | 0 | L$_1$ off |  |
|  | b$_{35}$, b$_{34}$ | 00 | L$_2$ off | F.L. photo |
|  |  | 10 | L$_2$ on off | note 2 |
|  |  | 01 | L$_2$ on | normal ambient light photo |
| DPR$_3$ | b$_{37}$, b$_{36}$ | 11 | L$_4$ on L$_3$ off | F.L. photo |
|  |  | 01 | L$_4$ on and off L$_3$ off | F.L. photo F.L photo ∞ warn |
|  |  | 10 | L$_4$ off L$_3$ off | F.L. photo and incomplete charge |
|  |  | 00 | L$_4$, L$_3$ off | normal photo |

[Note 1]
r.l. (rear lid) is opened and closed with film present.
[Note 2]
normal photo with lower limit of shutter speed for preventing a camera shake.
F.L. photo; flash light photographing.

TABLE 2

| b$_{26}$ | b$_{23}$ | b$_{22}$ | d$_{14}$ | d$_{13}$ | d$_{12}$ | d$_{11}$ | d$_{10}$ |
|---|---|---|---|---|---|---|---|
| 1 | 1 | 1 | L | H | H | L | L |
| 1 | 0 | 1 | L | H | L | H | L |
| 0 | 0 | 1 | L | L | L | H | L |
| 0 | 1 | 0 | L | L | L | L | H |

TABLE 2-continued

| $b_{26}$ | $b_{23}$ | $b_{22}$ | $d_{14}$ | $d_{13}$ | $d_{12}$ | $d_{11}$ | $d_{10}$ |
|---|---|---|---|---|---|---|---|
| 1 | 0 | 0 | H | L | L | H | L |

TABLE 3

| $b_{22}$ | $b_{21}$ | $b_{20}$ | $d_{25}$ | $d_{24}$ | $d_{23}$ | $d_{22}$ | $d_{21}$ | $d_{20}$ |
|---|---|---|---|---|---|---|---|---|
| 0 | 0 | 1 | L | L | L | L | L | H |
| 0 | 1 | 0 | L | L | L | L | H | L |
| 0 | 1 | 1 | L | L | L | H | L | L |
| 1 | 0 | 0 | L | L | H | L | L | L |
| 1 | 0 | 1 | L | H | L | L | L | L |
| 1 | 1 | 0 | H | L | L | L | L | L |

TABLE 4

| $b_{27}$ | $b_{26}$ | $d_{42}$ | $d_{41}$ | $d_{40}$ |
|---|---|---|---|---|
| 1 | 1 | L | H | L |
| 0 | 1 | H | L | L |
| 1 | 0 | L | L | H |
| 0 | 0 | L | L | L |

TABLE 5

| Ev value | $AC_1$ | $AC_2$ | $AN_{51}$ | $AS_2$ | $AS_3$ | $AS_4$ | control Ev |
|---|---|---|---|---|---|---|---|
| $Ev < Ev_L$ | L | L | L | OFF | OFF | ON | $Ev_L$ |
| $Ev_L < Ev < Ev_H$ | L | H | H | ON | OFF | OFF | Ev |
| $Ev_H < Ev$ | H | H | L | OFF | ON | OFF | $Ev_H$ |

TABLE 6

| BRW | BAF | FCR | $DPR_1$ | display |
|---|---|---|---|---|
| 1 | 0 | * | $0A_H$ | 0 |
| * | 1 | * | $AA_H$ | 00 |
| 0 | 0 | $00_H$ | $0A_H$ | 0 |
|   |   | $01_H$ | $B0_H$ | — |
|   |   | $02_H$ | $0B_H$ | — |
|   |   | $03_H$ | $01_H$ | 1 |
|   |   | $04_H$ | $02_H$ | 2 |
|   |   | $05_H$ | $03_H$ | 3 |
|   |   | $06_H$ | $04_H$ | 4 |
|   |   | $07_H$ | $05_H$ | 5 |
|   |   | $08_H$ | $06_H$ | 6 |
|   |   | $09_H$ | $07_H$ | 7 |
|   |   | $0A_H$ | $08_H$ | 8 |
|   |   | $0B_H$ | $09_H$ | 9 |
|   |   | $0C_H$ | $1A_H$ | 10 |
|   |   | $0D_H$ | $11_H$ | 11 |
|   |   | $15_H$ | $19_H$ | 19 |
|   |   | $25_H$ | $35_H$ | 35 |
|   |   | $29_H$ | $39_H$ | 39 |
|   |   | $2A_H$ | $39_H$ | 39 |

What is claimed is:

1. A mode setting device for use in a camera, comprising:
   operable means;
   means for outputting a signal in response to the operation of said operable means;
   memory means whose contents are changed in response to the signal outputted by said outputting means;
   means for measuring brightness of an object;
   means for judging whether or not the brightness measured by said measuring means is less than a predetermined value;
   first control means for controlling exposure;
   means for emitting flash light during the operation of said first control means;
   second control means for enabling said emitting means to emit the flash light when the contents of said memory means are a first value and the measured brightness is less than the predetermined value, or when the contents of said memory means are a second value, and for disabling said emitting means from emitting the flash light when the contents of said memory means are at the first value and the measured brightness is greater than the predetermined value, or when the contents of said memory means are a third value; and
   means for resetting the contents of said memory means to the first value in response to the completion of the operation of said first control means.

2. A mode setting device as claimed in claim 1, wherein said operable means consists of one operable member.

3. A mode setting device as claimed in claim 1, further comprising means for displaying a photographing mode according to the contents of said memory means.

4. A mode setting device for use in a camera, comprising:
   operable means;
   means for outputting a signal in response to the operation of said operable means;
   memory means whose contents are changed in response to the signal outputted by said outputting means;
   means for measuring brightness of an object;
   means for judging whether or not the brightness measured by said measuring means is less than a predetermined value;
   first control means for controlling exposure;
   means for emitting flash light during the operation of said first control means;
   second control means for enabling said emittig means to emit the flash light when the contents of said memory means are a first value and the measured brightness is less than the predetermined value, and for disabling said emitting means from emitting the flash light when the contents of said memory means are the first value and the measured brightness is greater than the predetermined value, or when the contents of said memory means are a second value; and
   means for resetting the contents of said memory means to the first value in response to the completion of the operation of said first control means.

5. A mode setting device as claimed in claim 4, wherein said operable means consists of one operable member.

6. A mode setting device as claimed in claim 4, further comprising means for displaying a photographing mode according to the contents of said memory means.

7. A mode setting device for use in a camera, comprising:
   operable means;
   means for outputting a signal in response to the operation of said operable means;
   memory means whose contents are changed in response to the signal outputted by said outputting means;
   means for measuring brightness of an object;

means for judging whether or not the brightness measured by said measuring means is less than a predetermined value;

first control means for controlling exposure;

means for emitting flash light during the operation of said first control means;

second control means for enabling said emitting means to emit the flash light when the contents of said memory means are a first value and the measued brightness is less than the predetermined value, or when the contents of said memory means are a second value, and for disabling said emitting means from emitting the flash light when the contents are the first value and the measured brightness is greater than the predetermined value; and means for resetting the contents of said memory means to the first value in response to the completion of the operation of said first control means.

8. A mode setting device as claimed in claim 7, wherein said operable means consists of one operable member.

9. A mode setting device as claimed in claim 7, further comprising means for displaying a photographing mode according to the contents of said memory means.

10. A mode setting device for use in a camera, comprising:

operable means;

means for outputting a signal in response to the operation of said operable means;

memory means whose contents are changed in response to the signal outputted by said outputting means;

means for measuring brightness of an object;

means for judging whether or not the brightness measured by said measuring means is less than a predetermined value;

first control means for controlling exposure;

means for emitting flash light during the operation of said first control means;

second control means for enabling said emitting means to emit the flash light when the contents of said memory means are a first value and the measured brightness is less than the predetermined value, or when the contents of said memory means are a second value, and for disabling said emitting means from emitting the flash light when the contents of said memory means are the first value and the measured brightness is greater than the predetermined value, or when the contents of said memory means are a third value;

timer means for starting to count time every time the contents of said memory means are changed; and means for resetting the contents of said memory means to the first value when said timer means counts a predetermined time.

11. A mode setting device as claimed in claim 10, wherein said operable means consists of one operable member.

12. A mode setting device as claimed in claim 10, further comprising means for displaying a photographing mode according to the contents of said memory means.

13. A mode setting device for use in a camera, comprising:

operable means;

means for outputting a signal in response to the operation of said operable means;

memory means whose contents are changed in response to the signal outputted by said outputting means;

means for measuring brightness of an object;

means for judging whether or not the brightness measured by said measuring means is less than a predetermined value;

first control means for controlling exposure;

means for emitting flash light during the operation of said first control means;

second control means for enabling said emitting means to emit the flash light when the contents of said memory means are a first value and the measured brightness is less than the predetermined value, and for disabling said emitting means from emitting the flash light when the contents of said memory means are the first value and the measured brightness is greater than the predetermined value, or when the contents of said memory means are a second value;

timer means for starting to count time every time the contents of said memory means are changed; and means for resetting the contents of said memory means to the first value when said timer means counts a predetermined time.

14. A mode setting device as claimed in claim 13, wherein said operable means consists of one operable member.

15. A mode setting device as claimed in claim 13, further comprising means for displaying a photographing mode according to the contents of said memory means.

16. A mode setting device for use in a camera, comprising:

operable means;

means for outputting a signal in response to the operation of said operable means;

memory means whose contents are changed in response to the signal outputted by said outputting means;

means for measuring brightness of an object;

means for judging whether or not the brightness measured by said measuring means is less than a predetermined value;

first control means for controlling exposure;

means for emitting flash light during the operation of said first control means;

second control means for enabling said emitting means to emit the flash light when the contents of said memory means are a first value and the measured brightness is less than the predetermined value, or when the contents of said memory means are a second value, and for disabling said emitting means from emitting the flash light when the contents of said memory means are the first value and the measured brightness is greater than the predetermined value;

timer means for starting to count time every time the contents of said memory means are changed; and means for resetting the contents of said memory means to the first value when said timer means counts a predetermined time.

17. A mode setting device as claimed in claim 16, wherein said operable means consists of one operable member.

18. A mode setting device as claimed in claim 16, further comprising means for displaying a photographing mode according to the contents of said memory means.

19. A film mounting display device for use in a camera which comprises:
- first detecting means for detecting closure and opening of a rear lid of the camera,
- second detecting means for detecting the presence of photographic film mounted in the camera,
- memory means for storing a warning signal when it is detected by the first detecting means that the rear lid is opened and it is detected by the second detecting means that the photographic film is mounted in the camera, and
- means for displaying the presence of the photographic film in the camera when the memory means stores the warning signal under the state that the rear lid is closed.

* * * * *

UNITED STATES PATENT AND TRADEMARK OFFICE
CERTIFICATE OF CORRECTION

PATENT NO. : 4,959,679

DATED : Sep. 25, 1990

INVENTOR(S) : YAMAMOTO et al.

It is certified that error appears in the above-identified patent and that said Letters Patent is hereby corrected as shown below:

Title page "[75] Inventors:", delete Ikushi Nakamura and

Michihiro Iwata.

Signed and Sealed this

Nineteenth Day of May, 1992

Attest:

DOUGLAS B. COMER

*Attesting Officer*   *Acting Commissioner of Patents and Trademarks*